(12) United States Patent
Alamry et al.

(10) Patent No.: US 11,459,427 B1
(45) Date of Patent: Oct. 4, 2022

(54) SYNTHESIS OF POLYANILINE OR DERIVATIVES THEREOF

(71) Applicant: King Abdulaziz University, Jeddah (SA)

(72) Inventors: Khalid A. Alamry, Jeddah (SA); Ajahar Khan, Jeddah (SA); Abdullah Mohamed Asiri, Jeddah (SA)

(73) Assignee: KING ABDULAZIZ UNIVERSITY, Jeddah (SA)

(*) Notice: Subject to any disclaimer, the term of this patent is extended or adjusted under 35 U.S.C. 154(b) by 0 days.

(21) Appl. No.: 17/495,991

(22) Filed: Oct. 7, 2021

(51) Int. Cl.
| | |
|---|---|
| *C08G 73/02* | (2006.01) |
| *C08J 7/14* | (2006.01) |
| *C08K 3/16* | (2006.01) |
| *C08K 5/053* | (2006.01) |
| *C08L 1/04* | (2006.01) |

(52) U.S. Cl.
CPC ............ *C08G 73/0266* (2013.01); *C08J 7/14* (2013.01); *C08K 3/16* (2013.01); *C08K 5/053* (2013.01); *C08L 1/04* (2013.01); *C08K 2201/019* (2013.01)

(58) Field of Classification Search
None
See application file for complete search history.

(56) References Cited

U.S. PATENT DOCUMENTS

| | | | |
|---|---|---|---|
| 7,040,756 B2 | 5/2006 | Qui et al. | |
| 2011/0045075 A1* | 2/2011 | Shuey | A61P 43/00 424/484 |

OTHER PUBLICATIONS

Salas et al., "Advanced Synthesis of Conductive Polyaniline Using Laccase as Biocatalyst", PLOS One, DOI: 10.1371/journal.pone.0164958, 2016.

Fan et al., "Preparation of carboxymethyl cellulose sulfates and its application as anticoagulant and wound dressing", International Journal of Biological Macromolecules, vol. 66; May 2014; p. 245-253.

Fu et al., "Fabrication of polyaniline/carboxymethyl cellulose/cellulose nanofibrous mats and their biosensing application", Applied Surface Science. 2015, 349: p. 35-42.

Kabiri et al., "Synthesis of cellulose/reduced graphene oxide/polyaniline nanocomposite and its properties", International Journal of Polymeric Materials and Polymeric Biomaterials, vol. 65, No. 13, pp. 675-682, 2016.

Li et al., "Preparation of conductive composite hydrogels from carboxymethyl cellulose and polyaniline with a nontoxic crosslinking agent", The Royal Society of Chemistry, 2017, 7: 54823-54828.

Shim et al., "Carboxymethyl Cellulose (CMC) as a template for Laccase-Assisted Oxidation of Aniline", Frontiers in Bioengineering and Biotechnology, 2020, vol. 8, Article 438.

Shown et al., "Fabrication of carbon microcoil/polyaniline composite by microemulsion polymerization for electrochemical functional enhancement", Chemical Engineering Journal, 2012, vol. 187: 380-384.

Tissera et al., "Heterogeneous in situ polymerization of polyaniline (PANI) nanofibers on cotton textiles: Improved electrical conductivity, electrical switching, and tuning properties", Carbohydrate Polymers, 2018, vol. 186: 35-44.

Zhang et al., "Periodate Oxidation of Carboxymethyl Cellulose under Controlled Conditions", Materials Science inc. Nanomaterials and Polymers, Chemistry Select, 2020, 5, 6765-6773.

* cited by examiner

*Primary Examiner* — Tae H Yoon
(74) *Attorney, Agent, or Firm* — WCF IP

(57) ABSTRACT

Provided are synthesis methods of polymerizing aniline or derivatives thereof. The production of polyaniline or polyaniline derivatives is controlled by the type of oxidant added in the reaction medium. The methods include the step of using a safe and environmentally friendly carbomethyl cellulose (CMC) or modified CMC as an oxidant in the polymerization reaction to produce polyaniline or aniline derivatives. Synthesis methods of producing O-CMC and O-CMC-S oxidants are also provided herein.

16 Claims, 16 Drawing Sheets

SYNTHESIS OF POLYANILINE OR DERIVATIVES THEREOF

FIELD OF THE INVENTION

The disclosure provides a method of polymerizing aniline or aniline derivative monomers (e.g., o-aminophenol (OAP)). In particular, the synthesis method includes a rapid chemical oxidative coupled polymerization, which uses an oxidized carboxymethyl cellulose (O-CMC) or an oxidized carboxymethyl cellulose sulfate (O-CMC-S) to produce polyaniline or polyaniline derivatives.

BACKGROUND

Polyaniline is a conductive polymer, which can be synthesized through either chemical polymerization or electrochemical polymerization. Polyaniline is conventionally prepared by polymerizing aniline monomers. The nitrogen atoms of monomer units are bonded to the para-carbon in the benzene ring of the next monomer unit. Generally, bulk chemical polymerization is the most common method to make polyaniline and such method produces polyaniline in a granular form.

Among various conductive polymers (CP), polyaniline (Pani) has emerged as one of the most promising CP due to its usefulness in a variety of applications, such as electronics and medical applications [1-3]. Pani has been widely considered as a versatile CP due to its excellent redox characteristics, variable oxidation states, reversibility in the dedoping/doping process, simple polymerization mechanism, and chemical stability [4-6]. Several types of Pani-based composite materials with inorganic/organic acids [1,7-9], metals [10,11], or minerals [12,13] and their properties such as nanostructures, solubility in various solvents, dichroism, formation of the tube, fiber, film, and sphere have been studied. [14,15]. The emeraldine salt form of Pani is found to be useful for the application of electrode material owing to its high conductivity and superb capacity for the charge storage [4]. Furthermore, some of the foremost practical advantages of Pani include cost-efficiency, high electrical conductivity, high environmental stability, and relatively easy preparation by electrochemical or chemical oxidation of aniline [16]. In a conventional chemical oxidative polymerization reaction, Pani is usually fabricated by oxidizing aniline monomers through ammonium or potassium persulfate in an acidic aqueous media (~2.4>pH) for converting aniline monomers into anilinium cations [6,17,18]. Under an alkaline atmosphere at a higher pH, different non-conducting oligomers of aniline consisting of quinine diimine or quinone units are produced [19,20].

O-aminophenol is a derivative of aniline in which the —OH of the aromatic ring is incomprehensibly garbled to form a quinine redox center [21]. The electropolymerization of aminophenols in acidic media produces poly(o-aminophenol) (P-OAP) film with attractive electrochemical properties [22]. Similar to aniline, the chemical oxidative polymerization of o-aminophenol in the presence of different oxidants such as ammonium or potassium peroxydisulfate, sodium dichromate, and barium manganate in an acidic media produces P-OAP [21].

Numerous methods are known for the production of polyaniline, including chemical, electrochemical, photochemical and enzymatic methods. However, most of the methods known in the art require the use of oxidants or reaction co-factors that are often considered toxic and suspected carcinogens, thus significantly limiting the application of the known method. Furthermore, currently known methods lead to the formation of by-products that result in a low regularity or branched polymer. Thus, there is a need in the art for an improved method to synthesize polyaniline or polyaniline derivatives in a convenient, nontoxic, and environmentally safe manner.

SUMMARY OF THE INVENTION

An object of the invention is to provide a method of polymerizing aniline or an aniline derivative through a rapid and green chemical oxidative coupling polymerization process with an environmentally friendly oxidant. In particular, the method includes using an oxidized form of carboxymethyl cellulose (O-CMC) or an oxidized form of carboxymethyl cellulose sulfate (O-CMC-S) as a reaction oxidant. The method also provides the steps of modifying carboxymethyl cellulose (CMC) by sulfating CMC with a nontoxic sulfating agent (N(SO$_3$Na)$_3$) followed by an oxidation reaction of the sulfated CMC with NaIO$_4$ to form O-CMC-S. These modified biopolymers can successfully synthesize polyaniline (Pani) and/or poly-o-aminophenol (P-OAP) without using conventional toxic oxidants. Granular morphology and electrical behavior of the synthesized polymers (i.e., Pani and/or P-OAP) were superior when synthesized by using 0-CMC as compared to that of the polymers which were generated by using conventional oxidants.

One aspect of the disclosure provides a method of making a polymer, comprising the steps of mixing carboxymethyl cellulose (CMC) with NaIO$_4$ and ethylene glycol to produce oxidized CMC and reacting the oxidized CMC with aniline or an aniline derivative in an acidic aqueous solution to form polyaniline or a polymerized aniline derivative. The acidic aqueous solution comprises an acid selected from the group consisting of hydrochloric acid, hydrogen bromide, sulfuric acid, perchloric acid, nitric acid, phosphoric acid, phosphonic acid, trifluoromethanesulphonic acid, toluene sulphonic acid, dodecylbenzenesulphonic acid, carboxylic acids, acetic acid, trichloroacetic acid, trifluoroacetic acid, formic acid, (1R)-(−)-10-camphorsulfonic acid, (1S)-(+)-10 camphorsulfonic acid, 2-acrylamido-2-methyl-1-propane sulfonic acid, and methanesulfonic acid. In preferred embodiments, the reaction does not use ammonium persulfate or potassium persulfate as an oxidant. In some embodiments, aniline derivative is selected from the group consisting of 1,2-diaminobenzene, 2,3-diaminonaphthalene, o-aminophenol (i.e., 2-aminophenol), m-aminophenol (i.e., 3-aminophenol), p-aminophenol (i.e., 4-aminophenol), m-toluidine and 1,3-diaminobenzene. In some embodiments, the % by weight ratio of NaIO$_4$ and CMC is 1:1. The method may further include steps of washing and drying polyaniline or a polymerized aniline derivative as well as the step of reacting CMC with N(SO$_3$Na)$_3$ to produce CMC sulfate (CMC-S). In some embodiments, CMC sulfate (CMC-S) is further oxidized by reacting with NaIO$_4$ and ethylene glycol. In such cases, the reaction may comprise a step of selecting either the oxidized CMC-S or the oxidized CMC as a main reaction oxidant to control the morphology of polyaniline or the polymerized aniline derivative. In preferred embodiments, the oxidized CMC and aniline or the aniline derivative are in a 1:2 to 2:1% by weight ratio.

Another aspect of the disclosure provides a method of making a polymer comprising the steps of mixing CMC with N(SO$_3$Na)$_3$ at 40-60° C. for 4-8 hours to form CMC-S, oxidizing CMC-S by mixing with NaIO$_4$, quenching by adding ethylene glycol, and reacting the oxidized CMC-S (O-CMC-S) with aniline or an aniline derivative in an acidic aqueous solution to form polyaniline or a polymerized aniline derivative. The acidic aqueous solution comprises an acid selected from the group consisting of hydrochloric acid, hydrogen bromide, sulfuric acid, perchloric acid, nitric acid, phosphoric acid, phosphonic acid, trifluoromethanesulphonic acid, toluene sulphonic acid, dodecylbenzenesulphonic acid, carboxylic acids, acetic acid, trichloroacetic acid, trifluoroacetic acid, formic acid, (1R)-(−)-10-camphorsulfonic acid, (1S)-(+)-10 camphorsulfonic acid, 2-acrylamido-2-methyl-1-propane sulfonic acid, and methanesulfonic acid. In preferred embodiments, the method does not use ammonium persulfate or potassium persulfate as a reaction oxidant. In some embodiments, the aniline derivative is 1,2-diaminobenzene or 1,3-diaminobenzene. In some embodiments, aniline derivative is selected from the group consisting of 1,2-diaminobenzene, 2,3-diaminonaphthalene, o-aminophenol (i.e., 2-aminophenol), m-aminophenol (i.e., 3-aminophenol), p-aminophenol (i.e., 4-aminophenol or iso-aminophenol), m-toluidine and 1,3-diaminobenzene. In other embodiments, the aniline derivative is iso-aminophenol. The method may further comprise steps of washing and drying polyaniline or the polymerized aniline derivative. In some embodiments, $NaIO_4$ and CMC are in a 1:1% by weight ratio. In some embodiments, O-CMC-S is in a 1:2 to 2:1% by weight ratio with aniline or the aniline derivative.

Additional features and advantages of the present invention will be set forth in the description of disclosure that follows, and in part will be apparent from the description of may be learned by practice of the disclosure. The disclosure will be realized and attained by the compositions and methods particularly pointed out in the written description and claims hereof.

DETAILED DESCRIPTION

Figure 1A:
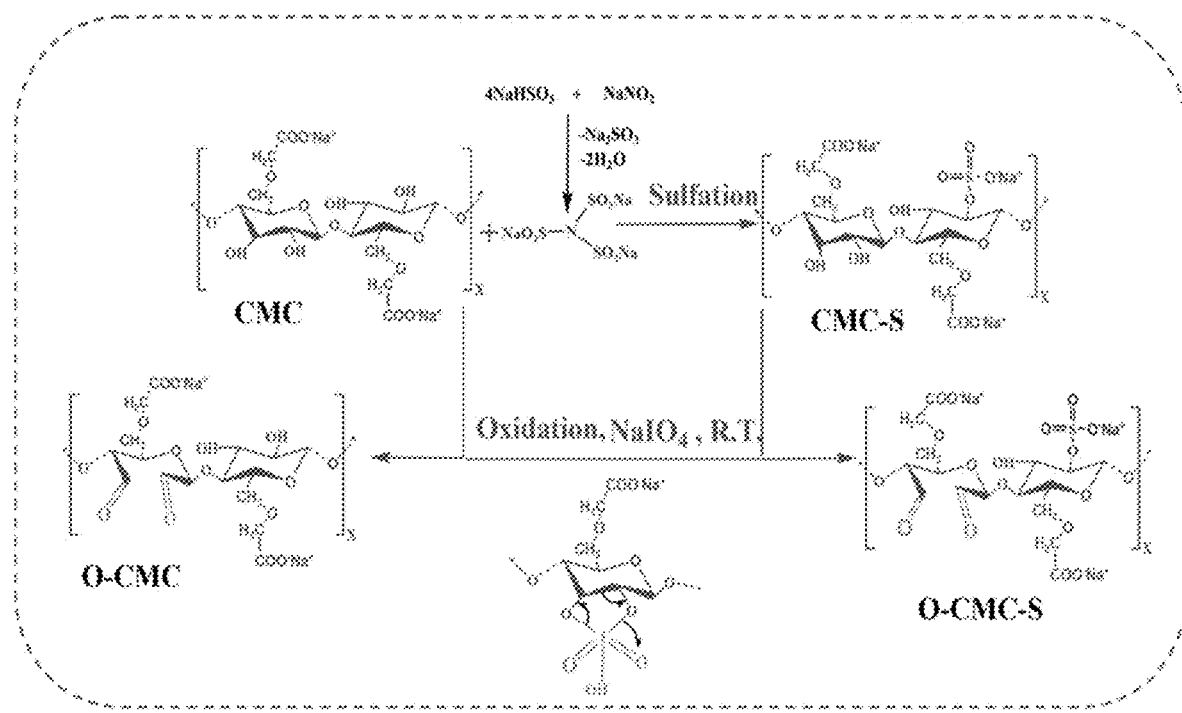
FIGS. 1A-B are schematic diagram and sketch representing (A) exemplary mechanisms of the reaction of CMC into CMC-S or O-CMC-S and (B) synthesis methods of Pani and P-OAP.

The preferred embodiments of the present disclosure are directed toward a synthesis method that provides a green and simple strategy for an efficient oxidative coupling polymerization reaction of aniline or o-amino phenol (i.e., aniline derivative) in an aqueous medium in the presence of an oxidized carboxymethyl cellulose (O-CMC) or an oxidized carboxymethyl cellulose sulfate (O-CMC-S) as a green oxidizing agent, which replaces a conventionally used toxic oxidant such as ammonium or potassium persulfate. In some embodiments, O-CMC is obtained by treating with an equivalent weight of $NaIO_4$ and ethylene glycol. To manufacture O-CMC-S, in some embodiments, CMC is oxidized after sulfation with a non-toxic sulfating agent ($N(SO_3Na)_3$), which is produced by reacting sodium nitrite and sodium bisulfate. The resulted modified biopolymers O-CMC and/or O-CMC-S were used to polymerize aniline or its derivative (i.e., o-aminophenol) to produce polyaniline (Pani) or poly-o-aminophenol (P-OAP), respectively. In some embodiments, the polymerization of Pani may be carried out in the presence of potassium persulfate in an acidic aqueous medium. In other embodiments, the polymerization of Pani may be carried out in the absence of potassium persulfate or any conventionally used oxidant in an acidic aqueous medium.

One aspect of the disclosure provides a method of making a polymer, comprising the steps of mixing carboxymethyl cellulose (CMC) with $NaIO_4$ and ethylene glycol to produce oxidized CMC and reacting the oxidized CMC with aniline or an aniline derivative in an acidic aqueous solution to form polyaniline or a polymerized aniline derivative. The term "aniline" as used herein, refers to both substituted and unsubstituted aniline monomer, as well as dimers or oligomers thereof up to eight units in length, as described in U.S. Pat. No. 7,713,446 to Epstein, herein incorporated by reference. The term "polyaniline" is also intended to refer to and encompass polymers of both substituted and unsubstituted anilines unless specifically noted. Polyaniline produced according to the process of this invention may be prepared from the polymerization of unsubstituted aniline or a substituted aniline monomer. In addition, dimers as well as oligomers having up to eight repeating aniline or substituted aniline units may also be used in the various embodiments. An exemplary general chemical formula of aniline derivatives is:

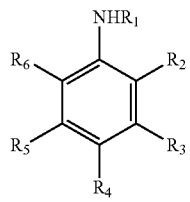

wherein, $R_1$, $R_2$, $R_3$, $R_4$, $R_5$, and $R_6$ are independently selected from the group consisting of: hydrogen atom, alkyl, alkoxy, alkylsulfonyl, arylsulfonyl, halogen, alkoxycarbonyl, alkythio, alkylsulfuryl (alkoxysulfonyl), cycloalkyl, sulfonic, aryl or carboxylic substituted alkyl substituents. Specific substituted anilines that may be amenable to the present processes include 2-aminobenzenesulfonic acid, 3-aminobenzenesulfonic acid, orthanilic acid, o-toluidine, m-toluidine, o-anisidine, m-anisidine, as well as polyhalogen anilines such as 2-fluoroaniline, 2-chloroaniline, 2-bromoaniline, 2-iodoaniline, 3-fluoroaniline, 3-chloroaniline, 3-bromoaniline, and 3-iodoaniline. In addition, it may be possible to use other monomers by modifying the disclosed processes including, for example, pyrrole, substituted pyrrole, thiophene, substituted thiophene and 3,4-ethylenedioxythiophene as well as the use of two or more monomers to produce a copolymer, such as aniline/pyrrole, aniline/toluidine or aniline/anisidine. Specific nanofibers of both poly(-o-toluidine) and sulfonated polyaniline were successfully produced using the present processes.

In some embodiments, the aniline derivative is 1,2-diaminobenzene or 1,3-diaminobenzene. In some embodiments, aniline derivative is selected from the group consisting of 1,2-diaminobenzene, 2,3-diaminonaphthalene, o-aminophenol (i.e., 2-aminophenol), m-aminophenol (i.e., 3-aminophenol), p-aminophenol (i.e., 4-aminophenol or iso-aminophenol), m-toluidine and 1,3-diaminobenzene. In other embodiments, the aniline derivative is iso-aminophenol. In some embodiments, the % by weight ratio of $NaIO_4$ and CMC is from 1:2 to 2:1, e.g., about 1:1. In other embodiments, the % by weight ratio of ethylene glycol and CMC is from 1:2 to 2:1, e.g. about 1:1. The method may further include the steps of washing and drying polyaniline or a polymerized aniline derivative as well as the step of reacting CMC with $N(SO_3Na)_3$ to produce CMC sulfate (CMC-S). In some embodiments, CMC sulfate (CMC-S) is further oxidized by reacting with $NaIO_4$ and ethylene glycol. In such cases, the oxidized CMC-S or the oxidized CMC may be selected as a main reaction oxidant to control the morphology of the polyaniline or the polymerized aniline derivative.

In some embodiments, the amount of oxidant initially present in solution prior to polymerization relative to the amount of initially present aniline and/or aniline derivatives in solution may vary. In some embodiments, the oxidized CMC or the oxidized CMC-S are in a 1:2 to 2:1% by weight ratio with aniline or the aniline derivative. In preferred embodiments, the oxidized CMC or the oxidized CMC-S are in a 1:1% by weight ratio with aniline or the aniline derivative.

Another aspect of the disclosure provides a method of making a polymer comprising the steps of mixing CMC with $N(SO_3Na)_3$ at 40-60° C. for 4-8 hours to form CMC-S, oxidizing CMC-S by mixing with $NaIO_4$, quenching by adding ethylene glycol, and reacting the oxidized CMC-S (O-CMC-S) with aniline or an aniline derivative in an acidic aqueous solution to form polyaniline or a polymerized aniline derivative. The acidic aqueous solution comprises an acid selected from the group consisting of hydrochloric acid, hydrogen bromide, sulfuric acid, perchloric acid, nitric acid, phosphoric acid, phosphonic acid, trifluoromethanesulphonic acid, toluene sulphonic acid, dodecylbenzenesulphonic acid, carboxylic acids, acetic acid, trichloroacetic acid, trifluoroacetic acid, formic acid, (1R)-(−)-10-camphorsulfonic acid, (1S)-(+)-10 camphorsulfonic acid, 2-acrylamido-2-methyl-1-propane sulfonic acid, and methanesulfonic acid. In some embodiments, the aniline derivative is 1,2-diaminobenzene or 1,3-diaminobenzene. In some embodiments, aniline derivative is selected from the group consisting of 1,2-diaminobenzene, 2,3-diaminonaphthalene, o-aminophenol (i.e., 2-aminophenol), m-aminophenol (i.e., 3-aminophenol), p-aminophenol (i.e., 4-aminophenol or iso-aminophenol), m-toluidine and 1,3-diaminobenzene. In some embodiments, the aniline derivative is iso-aminophenol. The method may also further comprise the steps of washing and drying polyaniline or a polymerized aniline derivative. In some embodiments, O-CMC-S is in a 1:2 to 2:1% by weight ratio with aniline or the aniline derivative.

In preferred embodiments, the reaction does not use or include ammonium persulfate or potassium persulfate. In addition, other conventionally used oxidants for the polymerization of aniline are not used. Alternatively, in some embodiments, some of the conventionally used oxidants (e.g., potassium persulfate, potassium perchlorate, etc.) may be included. Some exemplary oxidizing agents may include ammonium peroxydisulfate (APS), persulfated salts such as, potassium persulfate, perchlorated salts such as potassium perchlorate, chlorinated salt such as potassium chlorinate, iodonated salt such as potassium iodonate, chlorinated iron such as ferric chloride, halogenated metal acids such as chloroaurate acid, fuming sulfuric acid, and ozone, particularly from APS, $K_2Cr_2O_7$, $KIO_3$, $FeCl_3$, $KMnO_4$, $KBrO_3$, $KClO_3$, peracetic acid or hydrogen peroxide. The reduced oxidant may remain in the resulting polymer nanofibers, as for example, iron or gold nanoparticles.

In an aqueous polymerization medium, any conventional protonic acid or mixtures thereof may be used in the present embodiments. Both inorganic and organic acids may be used including chiral acids. Such acids for use in the polymerization of aniline are known and include, but are not limited to, protonic acids which can be used to form a complex with the aniline monomer and to make it possible for the aniline monomer to be dissolved in water. In some embodiments, acidic aqueous solution may comprise an acid selected from the group consisting of hydrochloric acid, hydrogen bromide, sulfuric acid, perchloric acid, nitric acid, phosphoric acid, phosphonic acid, trifluoromethanesulphonic acid, toluene sulphonic acid, dodecylbenzenesulphonic acid, carboxylic acids, acetic acid, trichloroacetic acid, trifluoroacetic acid, formic acid, (1R)-(−)-10-camphorsulfonic acid, (1S)-(+)-10 camphorsulfonic acid, 2-acrylamido-2-methyl-1-propane sulfonic acid, and methanesulfonic acid.

As described in EXAMPLE 1, characteristics (e.g., surface morphology, conductivity, granular size, etc.) of the resulting polymerized aniline and/or aniline derivatives may be controlled by selection of the oxidant (i.e., O-CMC or O-CMC-S) that is to be added in the reaction mixture. As shown in EXAMPLE 1, the synthesized Pani and P-OAP polymers were characterized by Fourier transform infrared (FT-IR), X-ray diffraction (XRD), field emission scanning electron microscopy (FE-SEM), and UV-Vis spectroscopy analyses. Cyclic voltammetry (CV) analysis was performed to measure the oxidation-reduction peaks and stability of the fabricated polymers. The electrochemical behavior and electrochemical Impedance Spectroscopy (EIS) were used to demonstrate the electrical properties.

Example 1

An exemplary synthesis method and materials used for the method are described herein. Aniline, o-aminophenol (o-AP, pure, m.p=170-175° C., M.W.=109.13), sodium carboxymethyl cellulose sodium salt (having low viscosity, viscosity of a 1% solution in water at 20 C 30-70 c/s. pH of 2% solution 6-8) were purchased from BDH Chemicals Pvt. Ltd. Poole, England. Sodium nitrite, potassium persulfate, potassium ferricyanide, hydrochloric acid and sodium bisulfate were procured from Fisher Scientific Chemicals Pvt. Ltd. Rest of the reagents were of analytical grade and utilized without additional purification.

Modification of Carboxymethyl Cellulose

The modifications of carboxymethyl cellulose (CMC) were accomplished in two different ways; (1) O-CMC-S was obtained by oxidizing the CMC after sulfation [23]. A special sulfating agent ($N(SO_3Na)_3$) was prepared via sodium nitrite and sodium bisulfate. 1 M $NaHSO_3$ was taken in 80 mL of double-distilled water (DDW) followed by a dropwise addition of sodium nitrite (1 M in 20 mL DDW) into the round bottom flask fitted with condenser under continuous stirring at 90° C. up to 1.5 h to developed ($N(SO_3Na)_3$). The pH of $N(SO_3Na)_3$ solution was adjusted to ~8 with the help of 1 M NaOH. After that, 10 g of CMC powder was consequently mixed slowly with strong stirring (600 rpm) and allowed the reaction to proceed for 6 h at 45° C. Herein, the —OH groups of CMC after dissolution activates and favored the anion of CMC to react with the sulfating agent $N(SO_3Na)_3$ as shown in FIG. 1A. After completion of the sulfation reaction, the highly swollen gel-suspension of resultant CMC-sulfate (CMC-S) was dried at 50° C. in a hot air oven to evaporate the solvents completely. Then, CMC-S was thoroughly washed with double distilled water (DDW) and acetone followed by complete drying at 60° C., the oxidation of CMC-S was carried out according to the oxidation method known in the art [24]. After adding 100 ml of DDW into a round bottom flask, 6 g of CMC-S was solubilized and then the equivalent weight of $NaIO_4$ (6.0 g in 30 mL DDW) gradually poured into the suspension under constant magnetic stirring. Adjust pH to 3.5 with the aqueous solution of 1 M HCl. The reaction proceeded for additional 5.5 h using magnetic stirring under the exclusion of light by covering the flask with aluminum foil in order to prevent photocatalytic decomposition of periodate [25]. Upon the completion of the oxidation reaction, the oxidation reaction was quenched with the addition of 6.0 mL ethylene glycol followed by further stirring for 1 h. The addition of ethylene glycol decomposes the residual periodate [26]. The resultant oxidized CMC-S (O-CMC-S) was precipitated by adding an excess ethanol as an anti-solvent. Finally, thoroughly washed several times with DDW and ethanol to remove unreacted molecules and ionic compounds, and dried at 50° C. in a hot air oven [27]. On the other hand, in the second (2) reactions the O-CMC was obtained by treating pure CMC with the equivalent weight of $NaIO_4$ and ethylene glycol, by following the same aforesaid procedure used to oxidize O-CMC-S. FIG. 1A shows the schematic illustration of the modified CMC into its corresponding derivatives O-CMC and O-CMC-S.

Green Chemical Approach to Synthesize Polyaniline (Pani) and Poly(o-Aminophenol) (P-OAP)

Figure 1B:
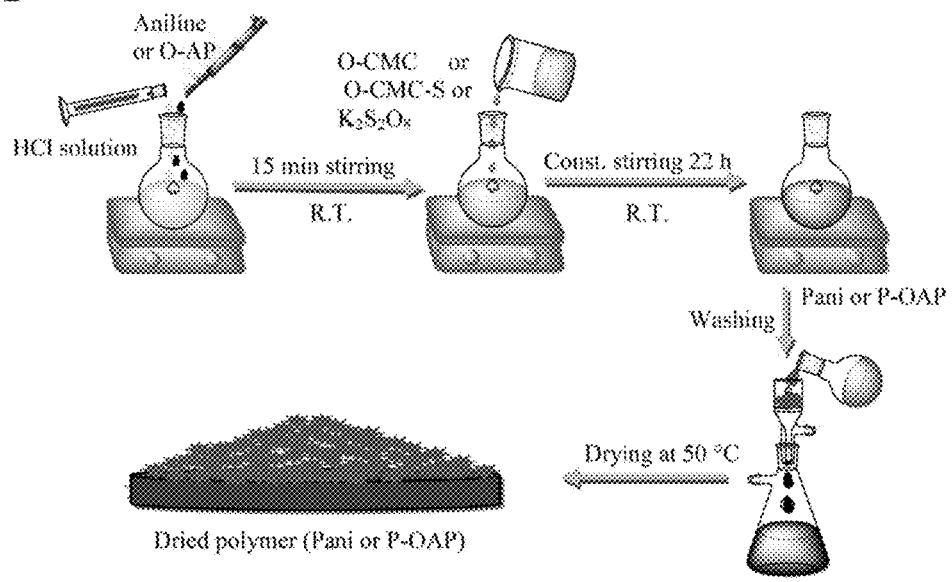

5% of each aniline (v/v) and o-aminophenol (OAP) (w/v) were separately dissolved in an aqueous solution of HCl (1 M; 100 mL DDW) with constant stirring (400 rpm). After that, aniline and OAP solutions were equally distributed into four round bottom flasks to make two sets, each containing 50 mL volume. Afterwards, 2 g of each O-CMC-S and O-CMC were slowly added into both sets containing aniline and OAP solutions under continuous stirring at room temperature. The pale-yellow color of aniline and brown color of OAP changed into greenish-black and reddish black after 5 min of addition of O-CMC-S and O-CMC, respectively. The stirring continued for additional 30 min at RT and the solutions of aniline and OAP were evolved from greenish and reddish color to greenish-black and brownish black, respectively. These color changes confirmed the polymerization of aniline and OAP into their respective polymers polyaniline (Pani) and poly(o-aminophenol) (P-OAP). Moreover, the reaction mixtures were further stirred for about 22 h and the resultant slurries were filtered and washed thoroughly with the excess of DDW to flush out the acids until the filtrate became clear and neutral. The prepared Pani and P-OAP polymers were dried at 60° C. in a hot air oven and converted into fine powders to be used for further characterization. In a similar procedure, Pani was also prepared using $K_2S_2O_8$ as an oxidant in place of O-CMC-S. FIG. 1B shows the schematic routes used to synthesize Pani and P-OAP using O-CMC and O-CMC-S. Table 1 represents the preparation of Pani and P-OAP using different oxidizing agents.

TABLE 1

Polymerization of aniline and its derivative o-aminophenol using O-CMC-S, O-CMC and $K_2S_2O_8$ at room temperature.

| Sample Number | Monomer | Oxidant | Time (min) | Color | Product |
|---|---|---|---|---|---|
| 1 | Aniline | O-CMC-S | 15 min | Greenish-black | Pani |
| 2 | o-aminophenol | | 5 min | Brownish-black | P-OAP |
| 3 | Aniline | O-CMC | 30 min | Greenish-black | P-OAP |
| 4 | o-aminophenol | | 15 min | Brownish-black | P-OAP |
| 5 | Aniline | $K_2S_2O_8$ | 25 min | Greenish-black | Pani |

Characterization of Pani and P-OAP

The modified CMC and compositions of the polymerized Pani and P-OAP were characterized by FT-IR. These polymer samples were used to obtain the FT-IR spectra in the range of 400-500 cm$^{-1}$. The FT-IR spectrometer used in the current work was a PerkinElmer 100 FT-IR Spectrometer-USA. The UV-vis spectra of aniline, OAP, Pani and P-OAP polymer samples were analyzed over 300-700 nm range using a Lambda 35-Perkin Elmer UV-vis spectrophotometer. Structural description of the synthesized Pani, and P-OAP polymers was carried out by FE-SEM at a Zeiss Evo 50 XVP, UK). The XRD patterns of the fabricated polymers were determined by Rigaku, Miniflex-II-Japan with Cu Kα (at 40 kV, 40 mA, and 2q with a scan angle:3-90°). The impedance studies and cyclic voltammetric hysteresis voltammograms were recorded using a modular Autolab 302N potentiostat/galvanostat coupled with an impedance analyzer (FRA32M.X). EIS analysis was measured out in 0.1 M potassium ferricyanide (made in 0.1 M KCl) at amplitude of 0.005 V with DC potential of +0.1 V at a frequency range of 0.1 Hz-100 kHz. CV analyses were carried out at 100 mV/s of scan rate, 0.0084 V of step potential modulation time of 0.024 s and a range of applied potential of −0.6 to 0.9 V. A three-electrode configuration comprising of working electrode as modified glassy carbon electrode, a platinum wire as counter electrode and Ag/AgCl as the reference electrode were used to measure electrochemical properties of the prepared Pani and P-OAP polymers.

An embodiment of the present disclosure provides a method using cellulose derivatives to polymerize aniline and its derivative OAP into their corresponding polymers through a green and straightforward route in an acidic aqueous solution without using conventional oxidants such as ammonium or potassium persulfate. Two types of modifications have been achieved with CMC; (1) the oxidation of CMC was carried out to obtain O-CMC, (2) oxidation of CMC-S to obtained O-CMC-S. After that, the modified biopolymers O-CMC and O-CMC-S were used to polymerize aniline and its derivative o-aminophenol (OAP) to get Pani and P-OAP respectively. The reaction between nonconducting modified-CMC and aniline or OAP produced two conducting polymers: polyaniline and P-OAP. In these embodiments, aniline or OAP was oxidized with O-CMC or O-CMC-S in solutions of hydrochloric acid, and in this context, aniline and/or OAP oligomers were present as major components of the oxidation products. The experimental results suggested that the O-CMC in aqueous solution of HCl was found to be suitable medium for the oxidation of aniline, as observed by its fast reaction rate. Thus, based on this data, O-CMC was used as an oxidant in other reactions described below. As a comparison, the fabrication of Pani has been carried out during the polymerization of aniline in solutions of HCl using potassium peroxydisulfate as an oxidant [28-31]. The obtained results suggested that Pani synthesized in the presence of O-CMC provides much improved electrochemical properties as compared to those of Pani synthesized by a conventional method, which utilizes potassium peroxydisulfate oxidant. Generally, classical oxidation of aniline and its derivatives has been carried out using the most common oxidizing agent, peroxydisulphates [28-31]. However, the synthesis of Pani with peroxydisulphates and other conventional methods suffer from various foremost disadvantages such as being expensive, increased in toxicity, and less accessible to certain chemicals, and non-biocompatible with complex methods of preparation. Further, some traditionally used synthesis methods require the use of harmful radiation. Therefore, the present invention provides solutions to the aforesaid disadvantages while simultaneously improving the structural firmness and electrical properties of the Pani and its derivative by introducing suitable biopolymer as an oxidant.

The conventional polymerization process of aniline with peroxydisulfate in acidic solutions proceeds in two steps [15,32]. In the first step, aniline molecules produce nonconducting aniline oligomers through exothermic oxidation. These non-conducting aniline oligomers consist of mixed quinoneimine moieties [33] and ortho- and para-coupled aniline constituent units [18,32]. The H-atoms abstracted from aniline are free as protons, which increase the acidity and produced anilinium cations. These are very complicated to oxidize, and that is why the oxidation reaction stops prematurely. Furthermore, when the acidity comes to the level required for the protonation of pernigraniline intermediate, anilinium cations participate in the growth of conducting polymer chains. Such phenomenon of aniline polymerization disruption using potassium or ammonium peroxydisulfate may also apply to O-CMC biopolymer.

Moreover, the acidic aqueous solution was made by using 1 M HCl. In the acidic solution, the coupling reaction of aniline is related to the removal of two H-atoms released as $H_+$. Therefore the entire oxidation is an intricate relationship of protonation processes and oxidation, decided by the acidity-time profile and starting pH during the reaction [32]. The oxidation of neutral aniline fabricates nonconducting oligomers that are made up of mixed ortho- and para-coupled aniline units, and several units of phenazines due to the cyclization of ortho-coupled units [32]. Therefore, the oxidative polymerization of the aniline and O-AP was achieved by preparing the solution 1 M HCl. Apart from HCl in order to oxidative polymerization of aniline and its derivatives, different types of acidic solutions based on hydrogen bromide, sulfuric acid, perchloric acid, nitric acid, phosphoric acid, phosphonic acid, trifluoromethane sulphonic acid, toluene sulphonic acid, and dodecylbenzene sulphonic acid etc. can be used. Furthermore, the important reason to select HCl was, it gives fast dissolution of modified O-CMC and produces a homogenous solution of the oxidizing agent. The use of such a homogenous solution of the oxidant toward polymerization reaction provide a fine product by mixing in a better way with the surrounding monomer units in the whole solution.

FT-IR Analysis of Pani and P-OAP

Figure 2A:
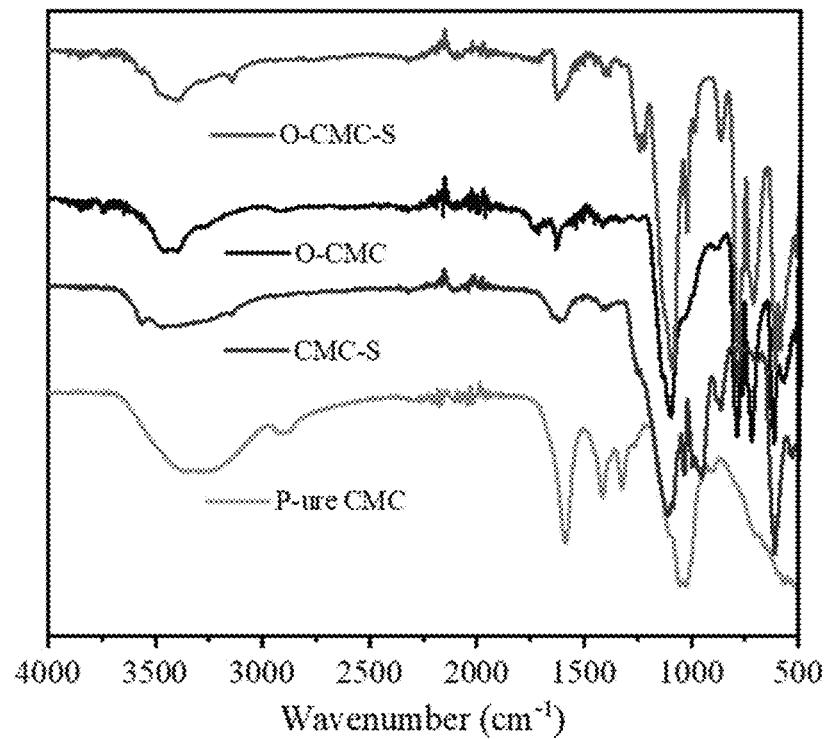
FIGS. 2A-C are FTIR spectra of (A) pure CMC, CMC-S, O-CMC and O-CMC-S (B) Pani synthesized in the presence of O-CMC, O-CMC-S or $K_2S_2O_8$ and (C) pure ortho-amino phenol (O-AP) and P-OAP synthesized by O-CMC or O-CMC-S.
Figure 2B:
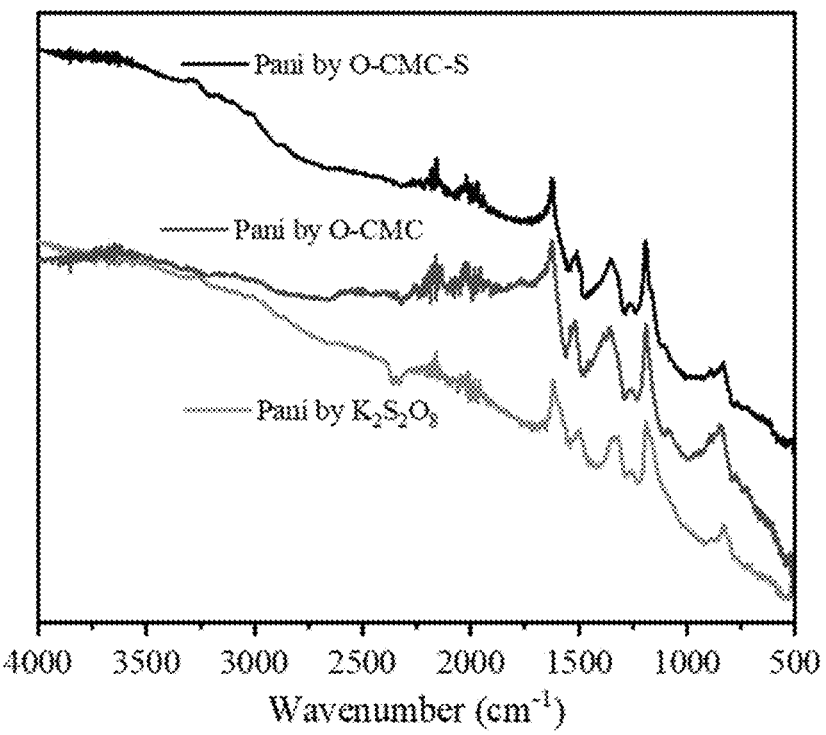
Figure 2C:
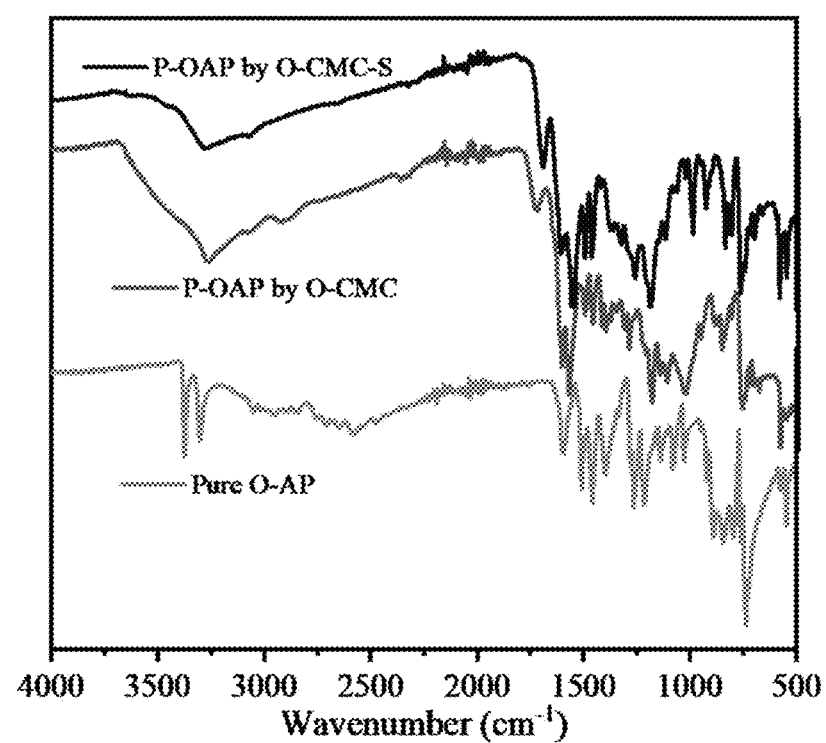

In FIG. 2A, the FTIR spectra of pure CMC, CMC-S, O-CMC and O-CMC-S are shown. In FIG. 2B, three different FTIR spectra of Pani synthesized by O-CMC, O-CMC-S or $K_2S_2O_8$ are shown. In FIG. 2C, the FTIR spectra of P-OAP synthesized by O-CMC or O-CMC-S as well as a pure OAP spectrum are shown. In FIG. 2A, transmittance spectra of pure CMC, CMC-S, O-CMC and O-CMC-S show strong absorption bands at ~3400, ~2909, ~1620, ~1415, ~1328, ~1065, ~720, and ~570 $cm^{-1}$ which are due to the characteristic vibrations of CMC assigned to the stretching vibration of hydroxyl groups (—OH), aliphatic C—H stretching vibration, asymmetric stretching of —COO−, stretching of —C—H and —CH$_2$ groups, bending vibration of —OH, stretching vibration of alcoholic —C—OH and CHO—CH$_2$ stretching, ring deformation of a-D-(1-6) linkage and ring stretching of a-D-(1-4) linkage respectively [34,35]. As shown in FIG. 2A, the CMC-S consists of two absorption bands at ~1180 and ~868 $cm^{-1}$ because of the characteristic asymmetrical stretching vibration of —S═O vibration and symmetrical stretching vibration of C—O—S related to the C—O—SO$_3$ group [36]. On the other hand, it can be observed that these bands were absent in pure CMC, which confirms the successful insertion of the —SO$_3$ group into the CMC. By comparing the FTIR spectra of CMC, O-CMC and O-CMC-S (FIG. 2A), apart from two characteristic bands at ~1620 and ~1415 $cm^{-1}$ resulted from the stretching's of carboxylic group, the appearance of the new typical shoulder at ~1730 $cm^{-1}$ in both O-CMC and O-CMC-S assigned are due to the presence of aldehyde groups, which suggests oxidation of the polymer backbone. Another band at ~862 $cm^{-1}$ is ascribed due to the hydrated and hemiacetal form of the polyaldehyde-CMC [37,38]. FIG. 2B shows the FTIR spectra of Pani polymers synthesized by $K_2S_2O_8$, O-CMC or O-CMC-S. For all three spectra, the appearance of absorption bands around ~1552 and ~1471 $cm^{-1}$ is ascribed due to C═C stretching vibrations in quinoid and benzenoid rings, respectively, and suggests the formation of emeraldine salt form of Pani [39,40]. The bands around wave number at ~1293 $cm^{-1}$ correspond to the C—N stretching vibration in the aromatic region and bands around ~1116 cm$^{-1}$ ascribe the asymmetric stretching of C=N (—N=quinoid=N—). These characteristics of IR bands confirm the successful fabrication of Pani using O-CMC and O-CMC-S. In FIG. 2C, the FT-IR spectra of OAP monomer and corresponding P-OAP synthesized by O-CMC and O-CMC-S are shown. As observed in the figure, the phenolic —NH$_2$ symmetric and asymmetric stretching vibration appearing in the o-aminophenol spectrum around ~3380 and ~3290 cm$^{-1}$ shifted to the lower wavelength of ~3271 and ~3071 cm$^{-1}$, respectively, with decreased intensity after the fabrication of P-OAP polymerization. Moreover, the broad absorption bands at around 3270 cm$^{-1}$, which do not appear in the IR spectrum of O-AP and correspond to the free hydroxyl groups, appeared in the spectrum of P-OAP [41]. All of the three spectra represent typical stretching vibrations of C=C for the benzoid rings between ~1460 and ~1598 cm$^{-1}$. It can be observed from FIG. 2C, for the P-OAP, the absorbance bands at ~1400 cm$^{-1}$ that are assigned to the deformation vibration of C—O—H almost diminished. Furthermore, a new absorption band around ~1114 cm$^{-1}$ can be seen, which was assigned the stretching vibration of the newly emerged C—O—C linkages in the P-OAP polymer backbone. The results obtained from FTIR analyses confirm that the O-CMC and O-CMC-S were able to substitute conventional oxidants (ammonium or potassium persulfate) and can be used for the polymerization of aniline and OAP into their corresponding Pani and P-OAP polymers.

FE-SEM Analyses of Pani and P-OAP

Figure 3A:
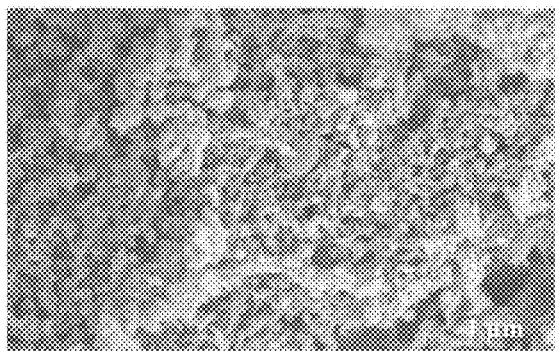
FIGS. 3A-E are representative surface morphologies of Pani polymers that are synthesized in the presence of (A) $K_2S_2O_8$, (B) O-CMC-S or (C) O-CMC. Surface morphologies of P-OAP synthesized in the presence of (D) O-CMC-C or (E) O-CMC are also shown according to an embodiment of the subject matter described in the disclosure.
Figure 3B:
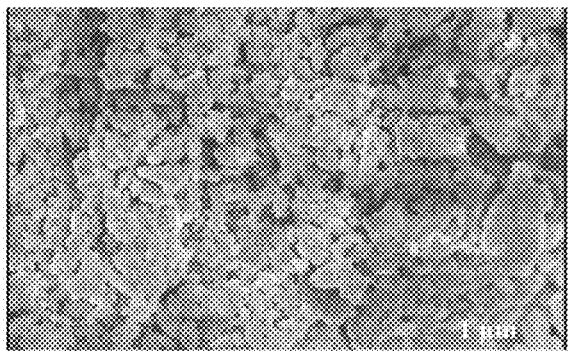
Figure 3C:
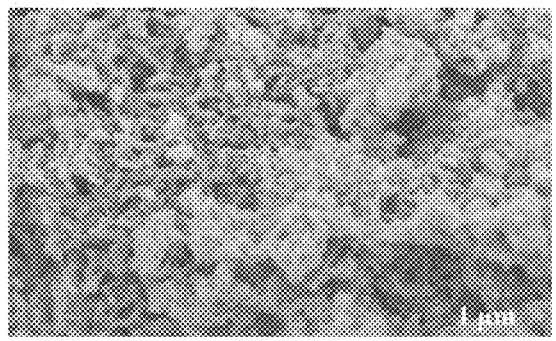
Figure 3D:
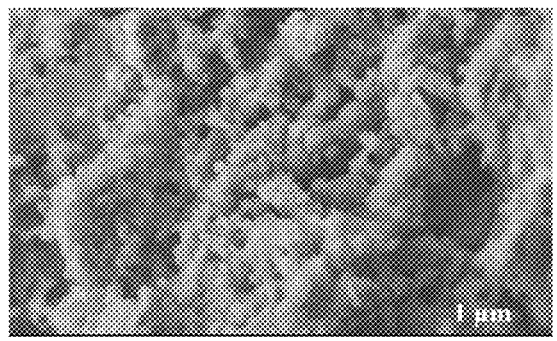
Figure 3E:
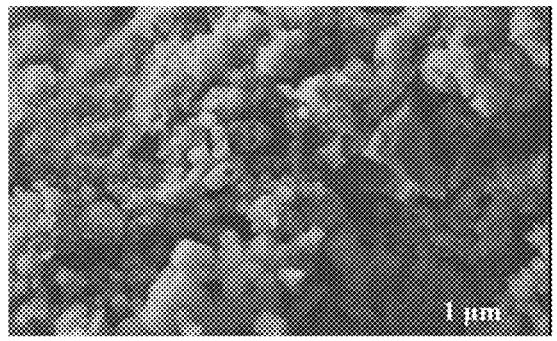

FE-SEM analysis was carried out to evaluate the granular structure of Pani or P-OAP polymers synthesized by O-CMC-S and O-CMC biomaterials (FIGS. 3A-E). The surface of Pani synthesized by $K_2S_2O_8$ exhibits a granular morphology typical of Pani prepared in an acidic medium (FIG. 3A). It is most common to obtain the granular morphology when Pani is synthesized under strongly acidic condition using strong oxidants or with high concentration of aniline at pH<2.4 [6,42,43]. On the other hand, the Pani synthesized by O-CMC-S (FIG. 3B) or O-CMC (FIG. 3C) had a similar granular morphology to the Pani synthesized by using a conventional oxidant $K_2S_2O_8$ (FIG. 3A). It can be observed from FIG. 3B, the morphology of Pani being flat flakes of different sizes of granules obtained by the polymerization of aniline using O-CMC-S is not similar with that of Pani prepared by $K_2S_2O_8$ or O-CMC (FIG. 3A or 3C, respectively). The polymerization of aniline with O-CMC (FIG. 3C) indicates a globular appearance typical of Pani prepared with conventional oxidant in acidic medium (FIG. 3A) [6]. The preparation of granules is supposed to be due to the random aggregation of monomers, which arises at large concentration of aniline in acidic conditions. This is a common concern used for the synthesis of emeraldine salt of Pani, and consequently, this is the most prevailing morphology observed [6]. Moreover, FIGS. 3D and 3E show the globular morphologies of P-OAP synthesized by O-CMC-S and O-CMC, respectively. The granular structure has frequently been used as a synonym of globular type. From the view of surfaces, O-CMC-S provided the morphology of the P-OAP similarly to O-CMC and no significant differences in the morphologies have been observed (FIGS. 3D-E). The FE-SEM micrographs also suggested that globular or granular-like forms are agglomerated which conceivably because of the filtration of Pani and P-OAP in the process of synthesis.

UV-Vis Studies of Pani and P-OAP

Figure 4A:
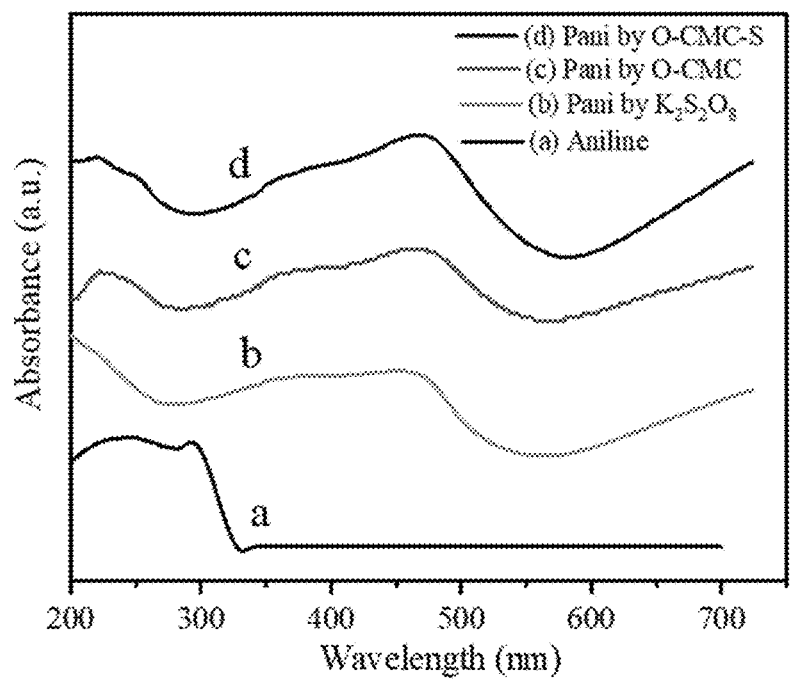
FIGS. 4A-B are UV-vis spectra for (A) aniline and Pani synthesized in the presence of $K_2S_2O_8$, O-CMC or O-CMC-S and (B) P-OAP synthesized in the presence of OAP, O-CMC or O-CMC-S.
Figure 4B:
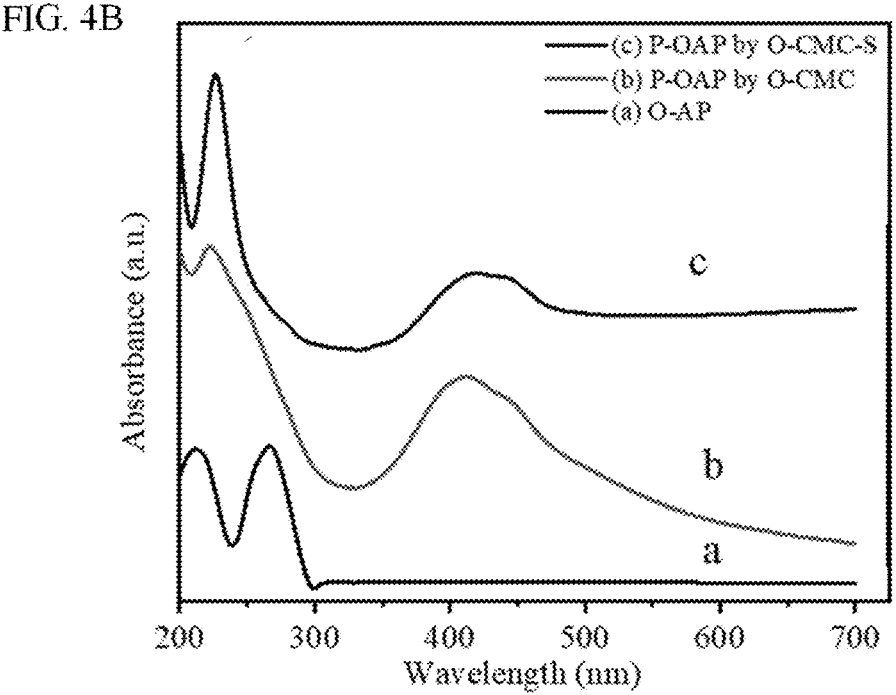

Referring to FIG. 4A, UV-vis spectra for monomer (a) aniline and Pani synthesized by (b) $K_2S_2O_8$, (c) O-CMC or (d) O-CMC-S are shown. As can be seen by UV-vis spectra for all three Pani synthesized by $K_2S_2O_8$ and/or biopolymers, distinctive characteristic absorption peaks of Pani at around 345-348 nm are assigned due to π-π* electron transition in benzenoid ring which has nearly vanished in the absorption spectrum of aniline (FIG. 4A) [44,45]. The band positioned at ~451 nm attributed to as polaron-η*, transition band, which is arisen due to the increased polaronic character of the Pani chain. A broad band in the form of free-shoulder tail after 650 nm attributes π-polaron transition band assigned due to emeraldine salt state of Pani. FIG. 4B shows the UV-vis spectra of OAP and POAP synthesized by (b) O-CMC, and (c) O-CMC-S. It is fascinating to perceive that the spectra of P-OAP prepared by both O-CMC and O-CMC-S are in good agreement. The characteristic absorption bands of both are located at 230, 417 with shoulder band around 460 nm that can be ascribed due to π-π*, polaron-π* and to π-polaron transition, respectively. From the spectra, it can be observed that the two peaks located at 417 and 460 nm are absent in the spectrum of O-AP monomer. The results of UV-vis analyses also suggested that modified cellulose in the form of O-CMC or O-CMC-S was able to polymerize aniline and its derivative OAP into their corresponding polymers Pani and P-OAP.

XRD Analyses of Pani and P-OAP

Figure 5A:
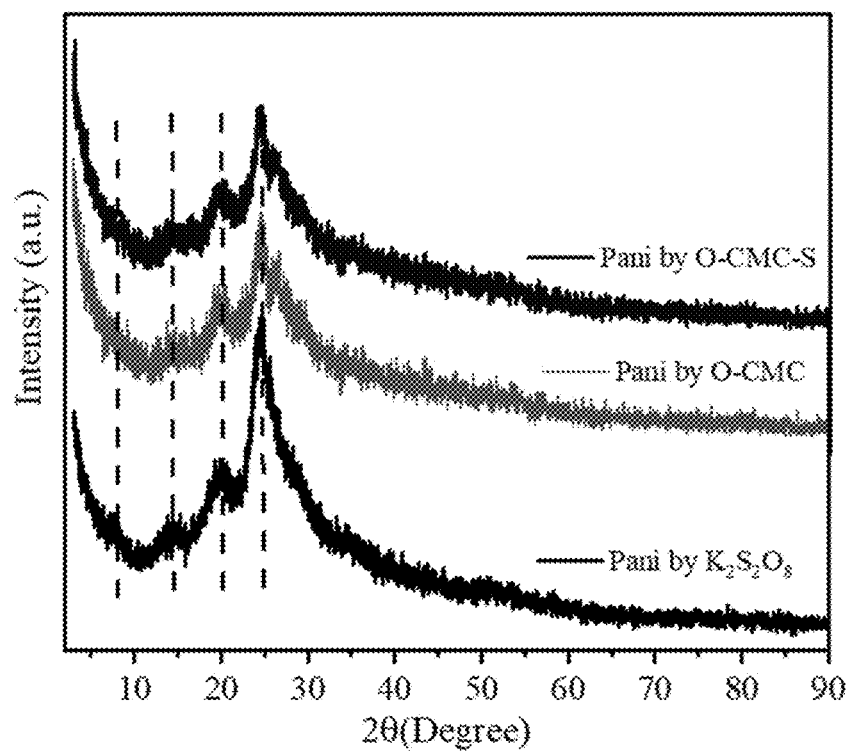
FIGS. 5A-B are X-ray diffraction patterns of (A) Pani synthesized in the presence of $K_2S_2O_8$, O-CMC or O-CMC-S and (B) P-OAP synthesized in the presence of O-CMC or O-CMC-S.
Figure 5B:
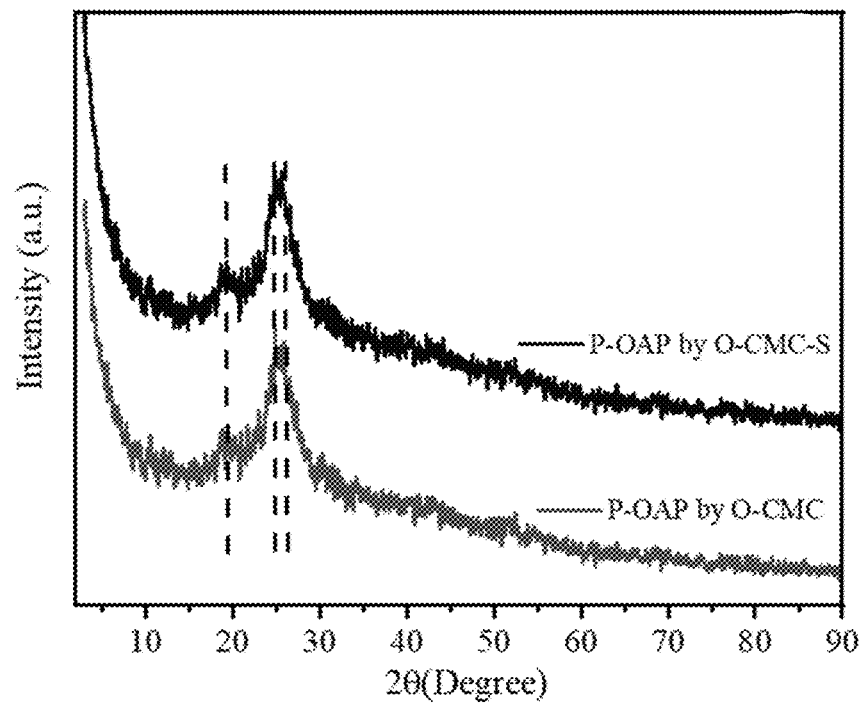

To determine the structural morphologies of the synthesized Pani and P-OAP polymers, XRD study was carried out with an X-ray diffractometer. FIG. 5A represents the X-ray diffraction patterns of Pani polymerized by O-CMC, O-CMC-S, or $K_2S_2O_8$. Two broad scattering peaks centered at 2θ=20.02° and 25.01° are common for Pani polymers and can be observed in all three patterns, which might be assigned due to periodicity parallel and periodicity perpendicular to the Pani backbone respectively (FIG. 5A) [46,47]. The peaks at 2θ=8.78° and 14.62° were ascribed due to the monoclinic space group P21 [48]. However, the XRD scattering patterns analyses show that the degree of crystallinity of all the three types Pani synthesized by O-CMC, O-CMC-S and $K_2S_2O_8$ were relatively low. But some strong peaks shown from the fabricated Pani show amorphous to crystalline nature i.e., semi-crystalline structure, which might be assigned because of the planar nature of quinonoid and benzenoid functional groups. Moreover, this analysis reveals that the XRD-diffraction patterns for Pani synthesized by O-CMC and O-CMC-S appeared the same with respect to Pani obtained by a conventional oxidant $K_2S_2O_8$ with similar diffraction peaks. Furthermore, FIG. 5B shows the XRD patterns of P-OAP synthesized by O-CMC and O-CMC-S. The XRD patterns typically display the crystalline/amorphous structure of the synthesized P-OAP. The region with broad and low intensity indicates the amorphous nature and the regions with relatively sharp diffraction peaks are assigned based on their semi-crystalline nature. The position of the Bragg's peaks (2θ) in the diffraction patterns of both the polymers (FIG. 5B) centered at 2θ=18.99°, 24.69°, and 25.72°. The diffraction peaks at 2θ=25.72° in both P-OAP spectra are a characteristic of the Van der Waals distances among stacks of phenylene rings (P-OAP rings) [49]. Therefore, XRD analysis shows that O-CMC and O-CMC-S biopolymers can be used for synthesis of Pani and/or its derivative P-OAP polymers.

Electrochemical Properties of Pani and P-OAP

Figure 6A:
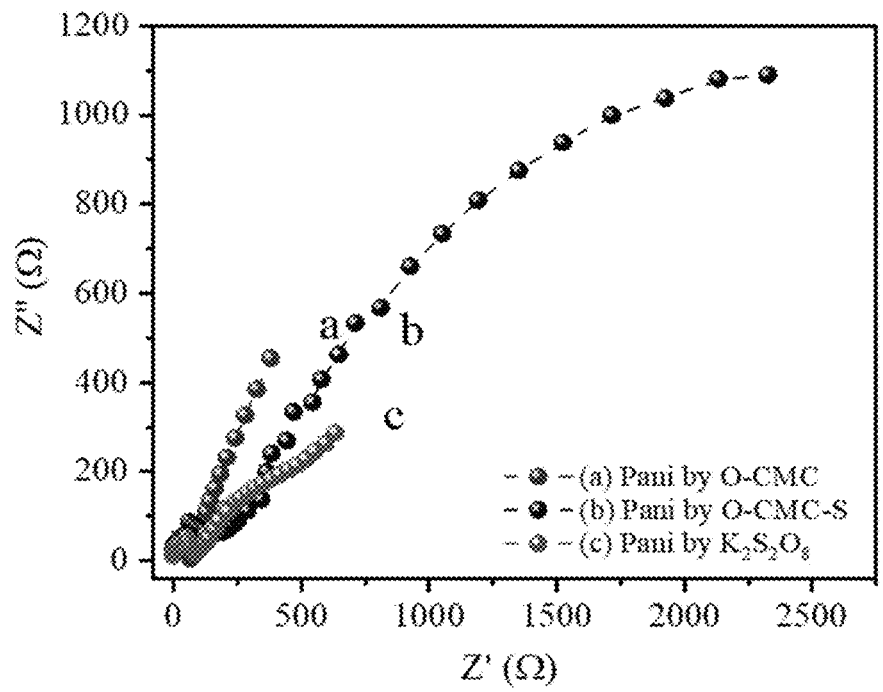
FIGS. 6A-E show (A) Nyquists plots of Pani synthesized by O-CMC, $K_2S_2O_8$ or O-CMC-S, (B) cyclic voltammetry hysteresis voltammograms of Pani synthesized by O-CMC, $K_2S_2O_8$ or O-CMC-S. Exemplary equivalent circuit models for Pani Synthesized by (C) O-CMC, (D) O-CMC-S or (E) $K_2S_2O_8$ are also shown according to embodiments of the subject matter described in the disclosure.

To demonstrate the electrochemical properties of Pani and P-OAP, the EIS tests and CV hysteresis behavior measurements were performed, which are widely used electroanalytical methods in different fields of chemistry. Therefore, to investigate the electrochemical properties of the synthesized Pani, EIS and cyclic voltammetric tests were performed. EIS analysis is an important technique that reveals the rate of electron mobility and resistivity of material on the electrode-solution interface. Nyquist plots were expressed in terms of the EIS analysis to confirm the successful synthesis of Pani. FIG. 6A shows a Nyquist plot exhibiting a straight line at a lower frequency range and a small higher frequency range semi-circular diameter for Pani synthesized by O-CMC as compared to the Pani synthesized by potassium persulfate and/or O-CMC-S, which plots comprise curved lines and large semi-circular diameter at a lower and a higher frequency range, respectively. The semi-circular loop is due to the charge transfer resistance (Rct), which designates electron transfer; on the other hand, at lower frequency concludes the process of diffusion [50]. Furthermore, the lesser value of Rct determines the improved rate of electron transfer and vice versa [51,52]. As shown in FIG. 6C-E, the equivalent circuit model consists of Rct (charge transfer resistance), Rs (solution resistance), W (Warburg resistance constant), and CPE (phase resistance respectively). The observation of Nyquist's plot reveals that Pani synthesized by O-CMC had a smaller semi-circle (Rct=72.29Ω) at a high-frequency region than that of Pani synthesized by potassium persulfate (Rct=116.00Ω) and 0-CMC-S(Rct=261.00Ω). This implies that electron transfer was much better at the surface of Pani synthesized by O-CMC.

Figure 6B:
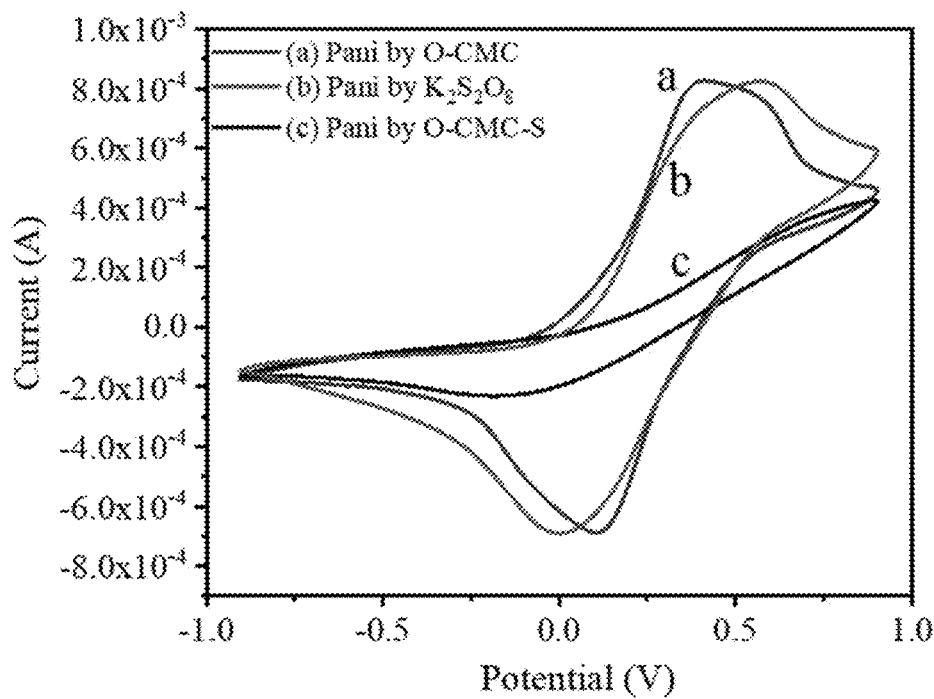
Figure 6C:
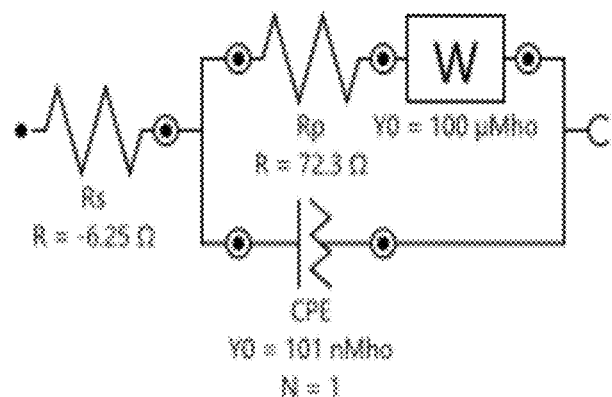
Figure 6D:
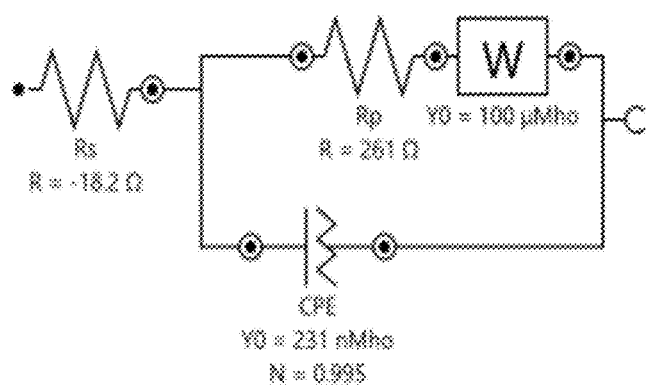
Figure 6E:
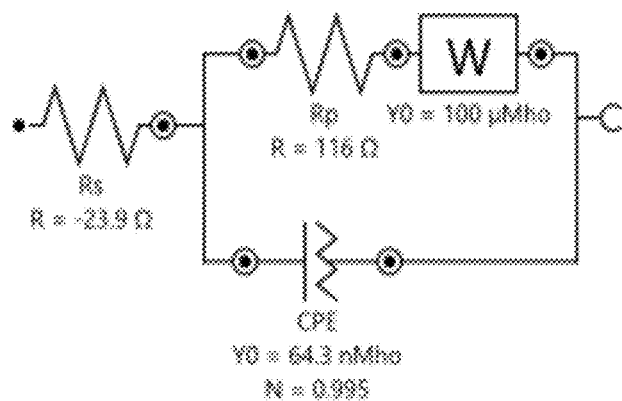

The CV voltammograms for the Pani prepared by O-CMC, O-CMC-S, and $K_2S_2O_8$ are presented in FIG. 6B at 100 mV s$^{-1}$ of scan rate in the potential range of −0.6 to 0.9 V. FIG. 6B shows that the Pani polymers synthesized by both O-CMC and potassium persulfate consist of redox peaks which indicate the electrical double-layer capacitance and possess rectangular shape (in the potential range −0.1 to 0.6 V) with pseudo-capacitance characteristics. However, the I-V hysteresis behavior of Pani synthesized with O-CMC-S was almost straight without redox peaks, which shows a negligible electrical double-layer capacitance (FIG. 6B). Moreover, it can be observed that Pani synthesized by O-CMC has redox peaks (about 0.34 V/0.10 V) that may be ascribed due to the redox transition of Pani amid a conducting (polaronicemeraldine) and semi-conducting (leucoemeraldine) states. As seen in FIG. 2B, the CV curve shows a shoulder anodic peak at approximately 0.49 V, which may be explained by the transformation amid the hydroquinone/p-benzoquinone [53,54]. Moreover, the CV voltammogram of pani synthesized by $K_2S_2O_8$ (FIG. 6B) shows only one anodic peak at approximately 0.49 V, however, Pani synthesized by O-CMC-S does not possess any anodic peak in this potential range. Therefore, it can be suggested that the electrochemical performance of Pani prepared by O-CMC was better than that of Pani prepared by $K_2S_2O_8$ and/or O-CMC-S.

Figure 7A:
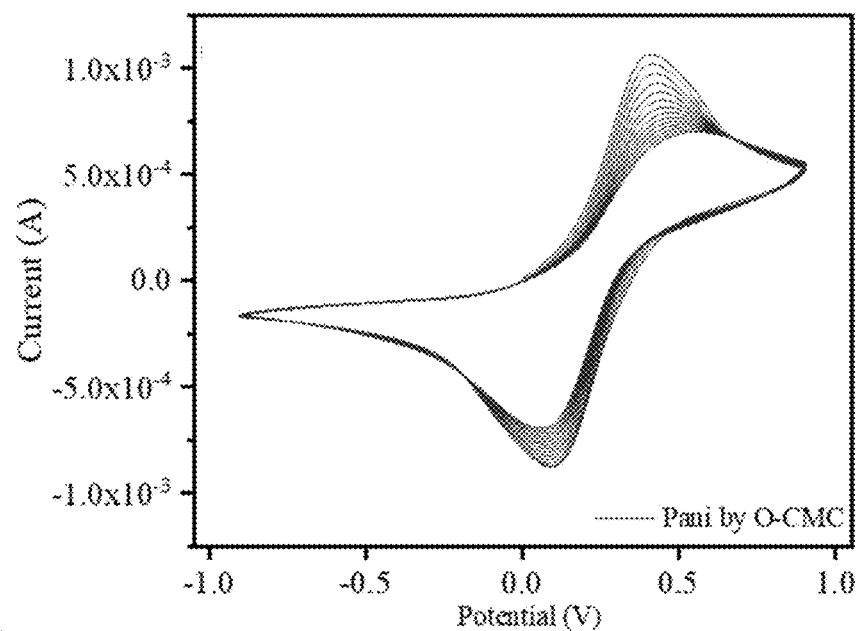
FIGS. 7A-D show cyclic voltammetry hysteresis voltammograms after multiple repeats for Pani synthesized by using (A) O-CMC, (B) $K_2S_2O_8$ or (C) O-CMC-S as an oxidant and (D) behavior of reduction peak current values after repetition.
Figure 7B:
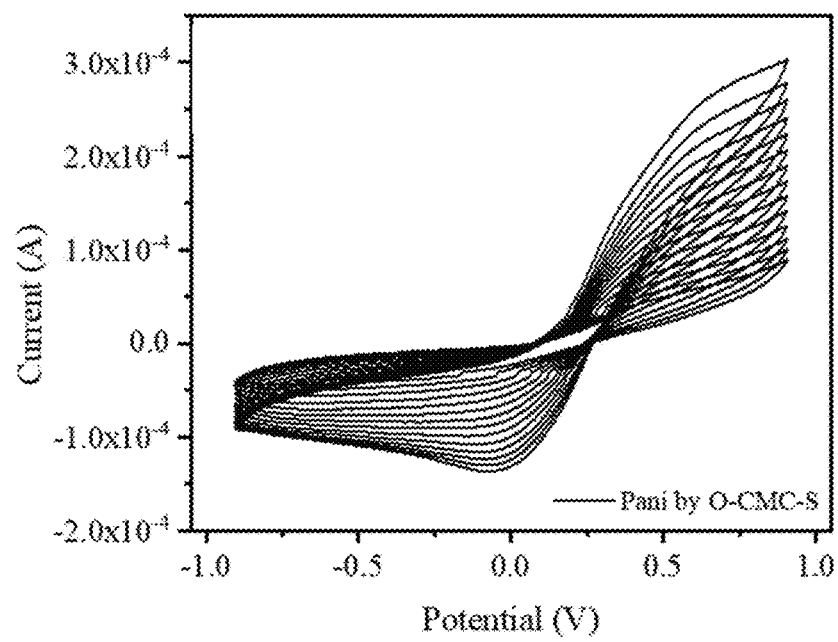
Figure 7C:
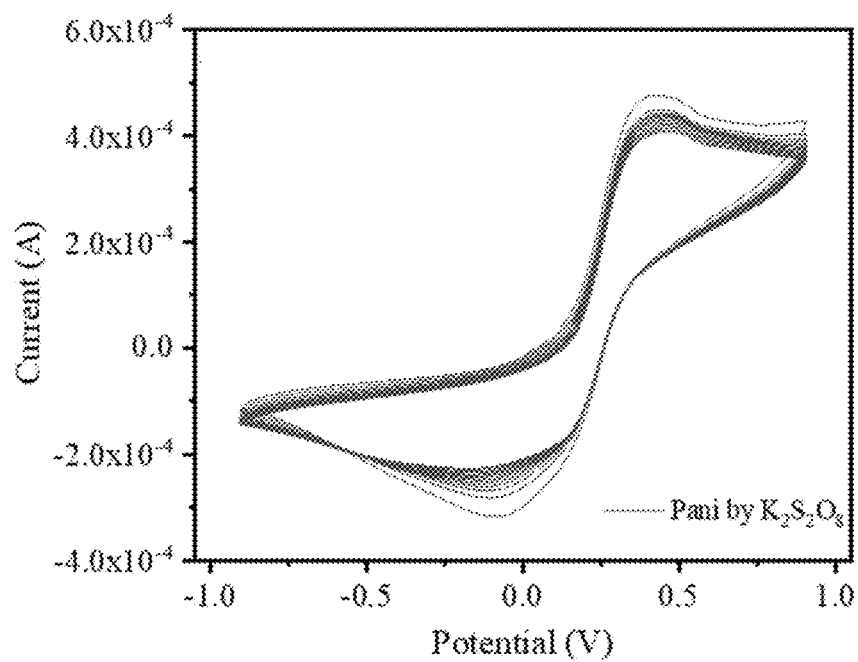
Figure 7D:
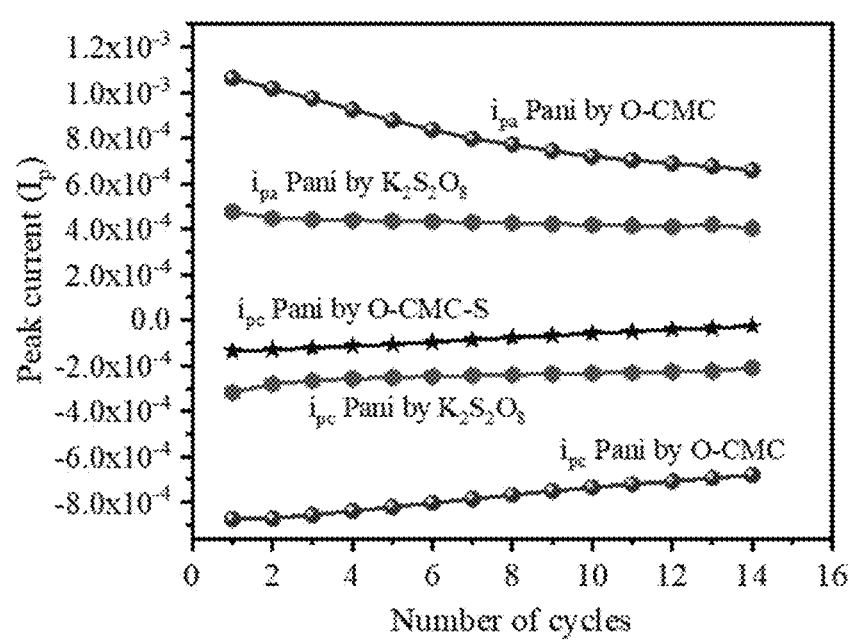

After multiple repeats, it was found that the CV voltammogram area of Pani synthesized by O-CMC was larger than that of the others two (FIG. 7A). FIG. 7B shows that with the repetition the peak current for Pani prepared by O-CMC-S gradually decreased, however, it was minimum for Pani synthesized by potassium persulfate (FIG. 7C), which suggested that the electrochemical oxidation/reduction was chemically reversible but the cathodic and anodic peaks current for Pani synthesized by O-CMC was still found to be higher when compared to the other two (FIG. 7A). This was confirmed from the values of reduction peak current as shown in FIG. 7D. This figure shows that the cathodic and anodic peaks current values found to be maximums for the Pani synthesized by O-CMC in comparison to the Pani synthesized by potassium persulafate (a conventional oxidizing agent used for aniline polymerization). The current analysis confirms that the Pani synthesized by O-CMC-S attributes to a higher current density even after the repetition of CV experiments. Furthermore, the I-V curve area was larger for Pani synthesized by O-CMC-S than that of Pani synthesized by potassium persulfate at a scan rate of 100 mV s$^{-1}$ in 0.1 M potassium ferricyanide. Therefore, the obtained electrochemical results suggested that the aniline polymerized into Pani using O-CMC implies electrochemically improved performance than that of Pani synthesized through a conventional oxidizing agent (potassium persulfate).

Figure 8A:
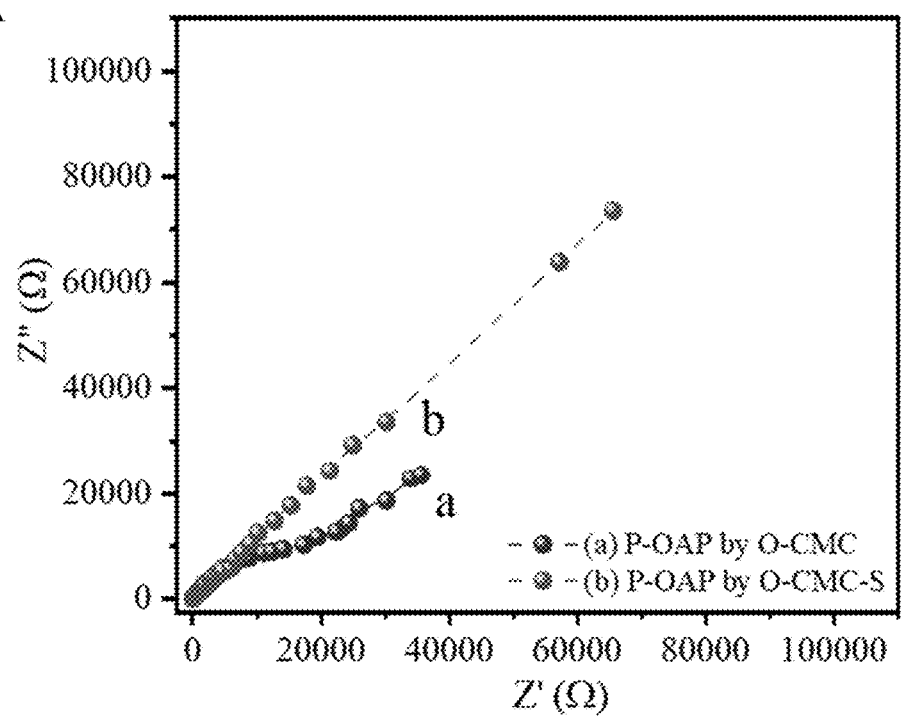
FIGS. 8A-D show (A) cyclic voltammetry hysteresis voltammograms and (B) Nyquists plots of P-OAP synthesized in the presence of O-CMC or O-CMC-S. An exemplary equivalent circuit models for P-OAP Synthesized in the presence of (C) O-CMC or (D) O-CMC-S are also shown according to embodiments of the subject matter described in the disclosure.
Figure 8B:
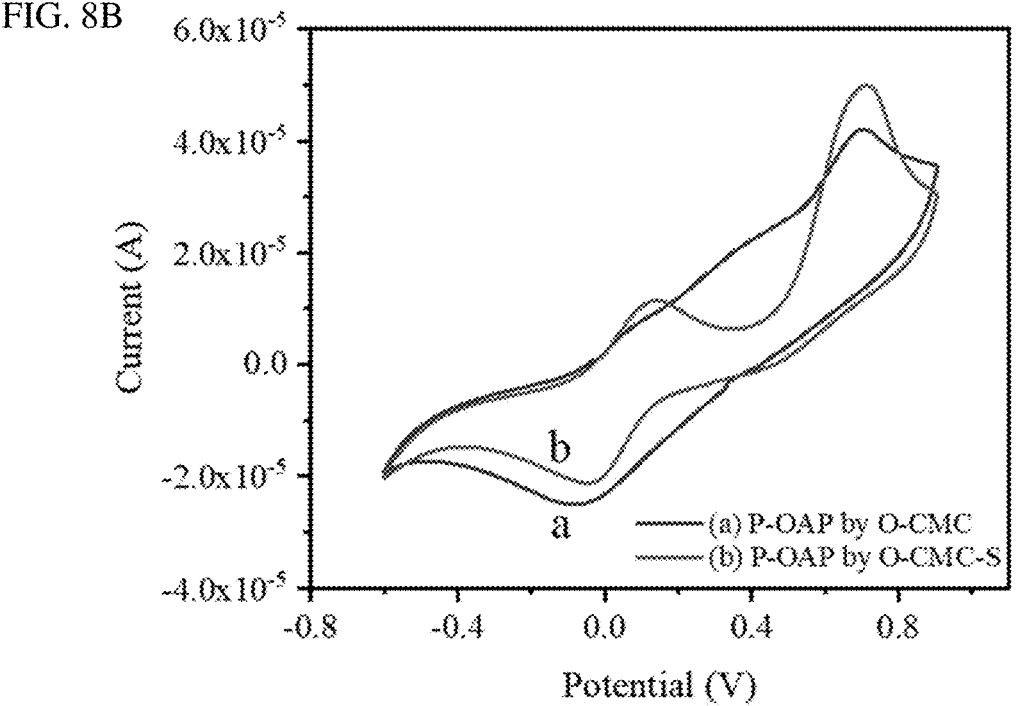
Figure 8C:
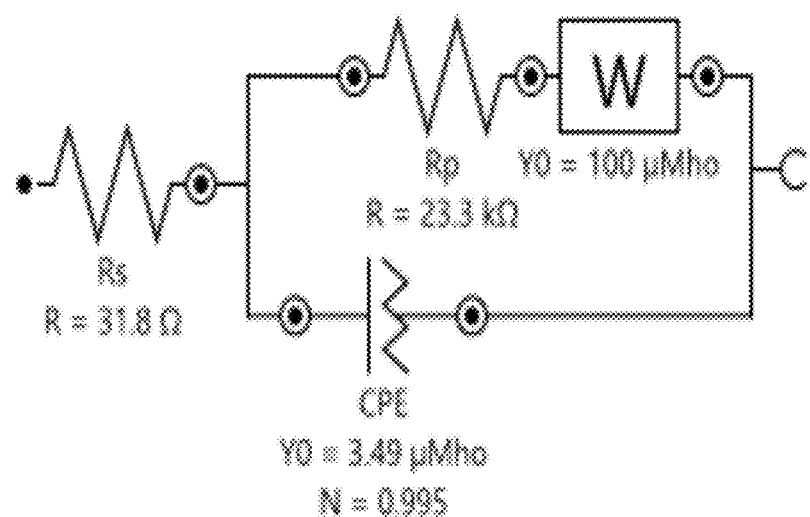
Figure 8D:
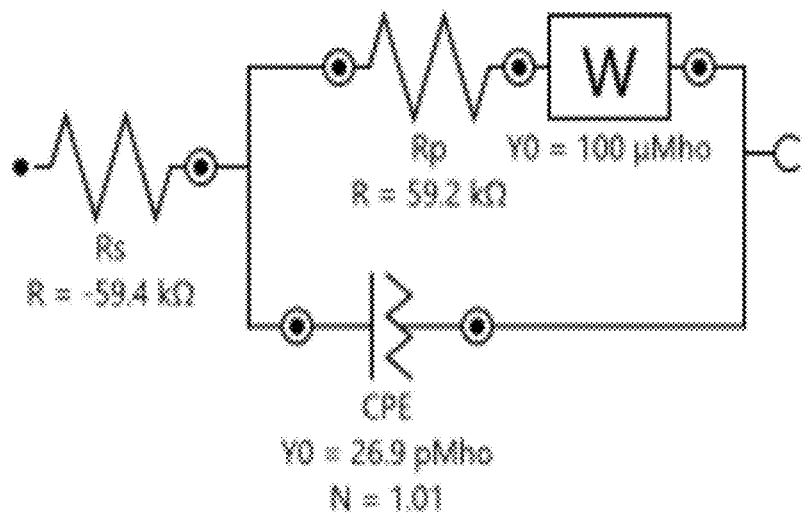

In a similar process to check the electrochemical properties of P-OAP synthesized using O-CMC or O-CMC-S, EIS analysis and CV tests were performed. FIG. 8A shows that the Nyquist plot exhibits a straight line and a small semi-circular diameter for P-OAP synthesized by O-CMC-S at lower and higher frequency respectively, whereas for P-OAP synthesized by 0-CMC comprises curved lines at lower frequency respectively. In FIG. 8C-D, the equivalent circuit model consists of Rct (charge transfer resistance), Rs (solution resistance), W (Warburg resistance constant), and CPE (phase resistance respectively) are shown. From the Nyquist's plot, it was found that P-OAP synthesized by O-CMC had a smaller semi-circle (Rct=23.30 kΩ) at a high-frequency region than that of P-OAP synthesized by O-CMC-S(Rct=59.20 kΩ). These results suggest that the P-OAP synthesized through O-CMC facilitates electron transfer much easier than that of synthesized using O-CMC-S. Moreover, the CV hysteresis behavior for the P-OAP prepared by O-CMC, O-CMC-S measured at 100 mV s$^{-1}$ in the potential range of −0.6 to 0.9 V, as shown in FIG. 8A. FIG. 8B shows that the P-OAP synthesized by O-CMC-S consists of redox peaks at a lower potential range, which indicates electrical double-layer capacitance and possess a rectangular shape (in the potential range −0.025 to 0.13 V), with pseudo-capacitance characteristics [55]. In successive increases in the voltage, an anodic oxidation peak appears in both P-OAP at more positive potential at 0.7 V vs. SCE (FIG. 8B) [56]. However, the reduction scan range in the cathodic region of CV exhibits the presence of associated reduction with a well-defined reduction peak at −0.01 V for both types of P-OAP, which confirms the synthesis of P-OAP with a complex redox action.

Pani and its derivative P-OAP have been successfully synthesized through a green and simple strategy using modified biomaterial O-CMC and O-CMC-S. The modified cellulose in the oxidized form possesses the potential to substitute conventional oxidants such as ammonium or potassium peroxydisulfate used for the polymerization of aniline and aminophenol. Detailed investigation of the FTIR and UV-Vis spectra suggests the formation of benzenoid and quinoid rings, which confirmed the fabrication of Pani and P-OAP polymers. The XRD analyses suggest the partially crystalline and amorphous nature of the synthesized polymers and the existence of characteristic diffraction patterns that are common for Pani and P-OAP. The electrochemical response of the Pani and P-OAP synthesized using O-CMC reflects the high current density, oxidation-reduction peak current, and stability at the high anodic potential. Also, the smaller semi-circle (Rct) at the high-frequency region obtained by EIS analyses suggested that Pani and P-OAP synthesized using O-CMC facilitate the electron transfer much easier than that of the synthesized Pani and P-OAP using O-CMC-S. After detailed studies of electrical properties and characterizations, Pani and P-OAP that were prepared by using O-CMC were observed to possess much higher electrical performance, stability, and better structural morphology than that of Pani and P-OAP synthesized by O-CMC-S. Thus, it may be presumed as one of the superior approaches to synthesize Pani and its derivatives using green biopolymers (modified cellulose), which may explore better practical applications in modern electronic devices without harming the environment and seems to be a replaceable alternate even for most commonly used toxic oxidants.

Synthesis of Poly(2,3-Diaminonaphthalene), Poly(m-Aminophenol) and Poly(m-Toluidine)

5% of each 2,3-Diaminonaphthalene (2,3_DAN) (w/v), m-aminophenol (m-AP) (w/v) or m-toluidine (m-TD) (v/v) was separately dissolved in 50 mL of 1 M HCl with constant stirring. The amount of 2 g of O-CMC was added slowly under continuous stirring into each of (2,3_DAN), m-AP, or m-TD solution at room temperature. The grey color of (2,3_DAN) and m-AP, and blackish color of m-TD solutions were observed to change into dark-purple and reddish black respectively after 5 min of addition of O-CMC respectively. After 30 min of further stirring at RT the solutions of 2,3_DAN, m-AP, and m-TD were provided to precipitate of dark-purple and reddish-black color, respectively. These color change along with the precipitation confirm the polymerization of 2,3_DAN, m-AP, and m-TD into their respective polymers: poly (2,3_DAN), poly (m-AP), and poly (m-TD), respectively. The reaction mixtures were further for 20 h under constant stirring and the resultant slurries were filtered and washed thoroughly with the excess of DDW to flush out the acids until the filtrate became clear and neutral. The obtained products of poly (2,3_DAN), poly (m-AP), and poly (m-TD) were dried at 50° C. and converted into fine powder. In a similar procedure, poly (2,3_DAN), poly (m-AP), and poly (m-TD) were also synthesized using $K_2S_2O_8$ as an oxidant in place of O-CMC.

FTIR Analysis of Poly (2,3_DAN)

Figure 9:
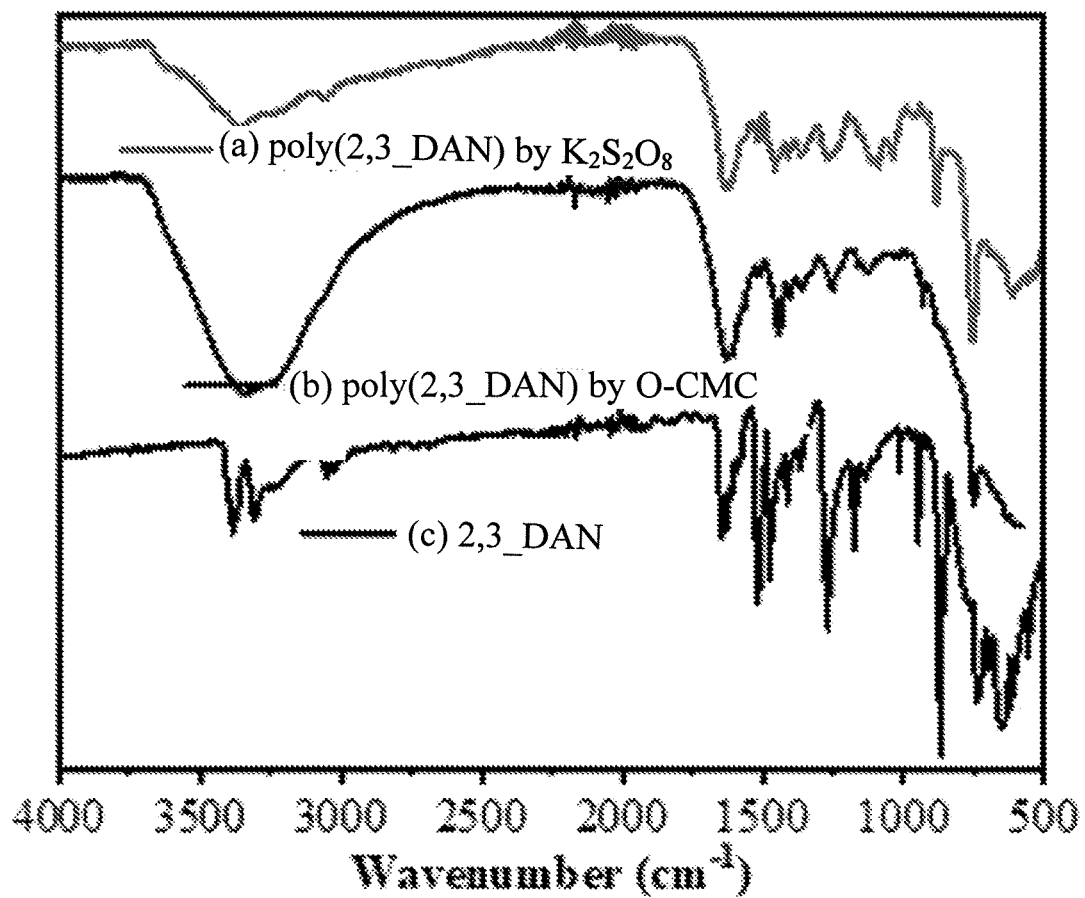
FIG. 9 shows FTIR spectra of pure 2,3-Diaminonaphthalene (2,3_DAN), poly (2,3_DAN) synthesized by O-CMC, and poly (2,3_DAN) synthesized by $K_2S_2O_8$.

FIG. 9 shows the FT-IR spectra of pure 2,3-Diaminonaphthalene (2,3_DAN), poly (2,3_DAN) polymerized by O-CMC and poly (2,3_DAN) polymerized by $K_2S_2O_8$. From FTIR spectra, it can be observed that due to the polymerization process, the IR bands of poly (2,3_DAN) are broader than that of 2,3_DAN. The IR bands for 2,3_DAN positioned around 3420 and 3314 $cm^{-1}$, assigned to the symmetric and asymmetric stretching of —$NH_2$. However, for poly (2,3_DAN) the broad band around 3475 $cm^{-1}$, revealing the oxidation of the amino groups to imino groups during oxidative polymerization. For naphthalene ring the stretching bands of 2,3_DAN positioned around 1626 and 1578 $cm^{-1}$, whereas the similar bands for poly (2,3_DAN) are shifted towards 1636 and 1504 $cm^{-1}$ and displayed broad bands because of the distortion of the amino groups. The diminishing of stretching band around 1400 $cm^{-1}$ for N=N and the emergence of a sharp band around 1245 (stretching) for —C—N— after polymerization reaction. Significant changes in the spectrum of poly (2,3_DAN) in the frequency range of 1000-1200 $cm^{-1}$, including the diminishing of several IR bands related to CH groups, were noticed, because of the duplicity that occurs due to C—C stretching bands. The results show that both types of poly (2,3_DAN) polymerized by two different types of oxidants such as O-CMC and $K_2S_2O_8$ exhibit alike FTIR spectra having similar characteristic IR peaks. From this analysis it can be concluded that proposed O-CMC as an oxidant possess the power to polymerize monomer into its corresponding polymer i.e., poly (2,3_DAN).

FT-IR Analysis of Poly (m-TD)

Figure 10:
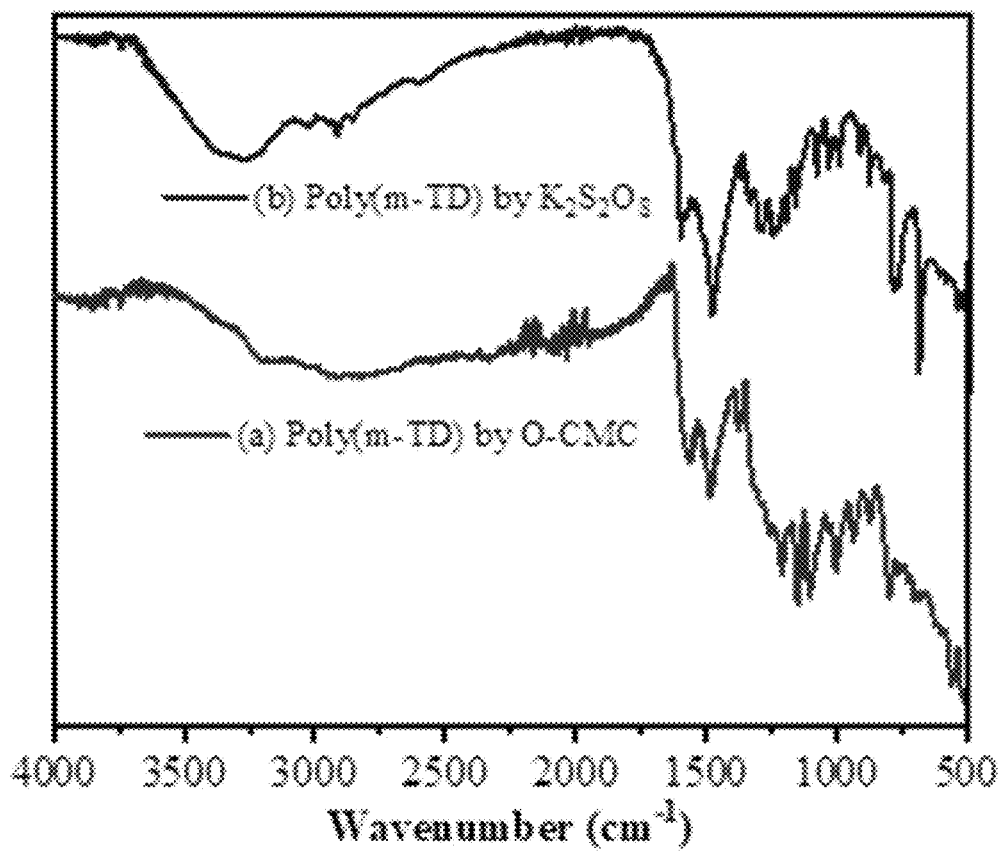
FIG. 10 shows FTIR spectra of poly (m-TD) synthesized by O-CMC and poly (m-TD) synthesized by $K_2S_2O_8$.

FIG. 10 shows the FTIR spectra of poly (m-TD) synthesized by O-CMC or $K_2S_2O_8$. The bands around 3251 $cm^{-1}$ are assigned to the stretching of —NH groups. The higher frequency bands positioned around 1595 and 1504 $cm^{-1}$ are attributed to the C=C stretching of benzenoid and C—N stretching frequency of quinoid ring. The band at 1213 $cm^{-1}$ assigned to the bending vibration of N—H and stretching vibration of the C=C for benzenoid. The sharp bands displayed around 1158 $cm^{-1}$ assigned to the rocking mode of —$CH_3$. Here also both types of poly (m-TD) polymerized by O-CMC and $K_2S_2O_8$ exhibit almost similar FTIR spectra, which confirm the potential of O-CMC as an oxidant to polymerize m-TD into poly (m-TD).

FTIR Analysis of Poly (m-AP)

Figure 11:
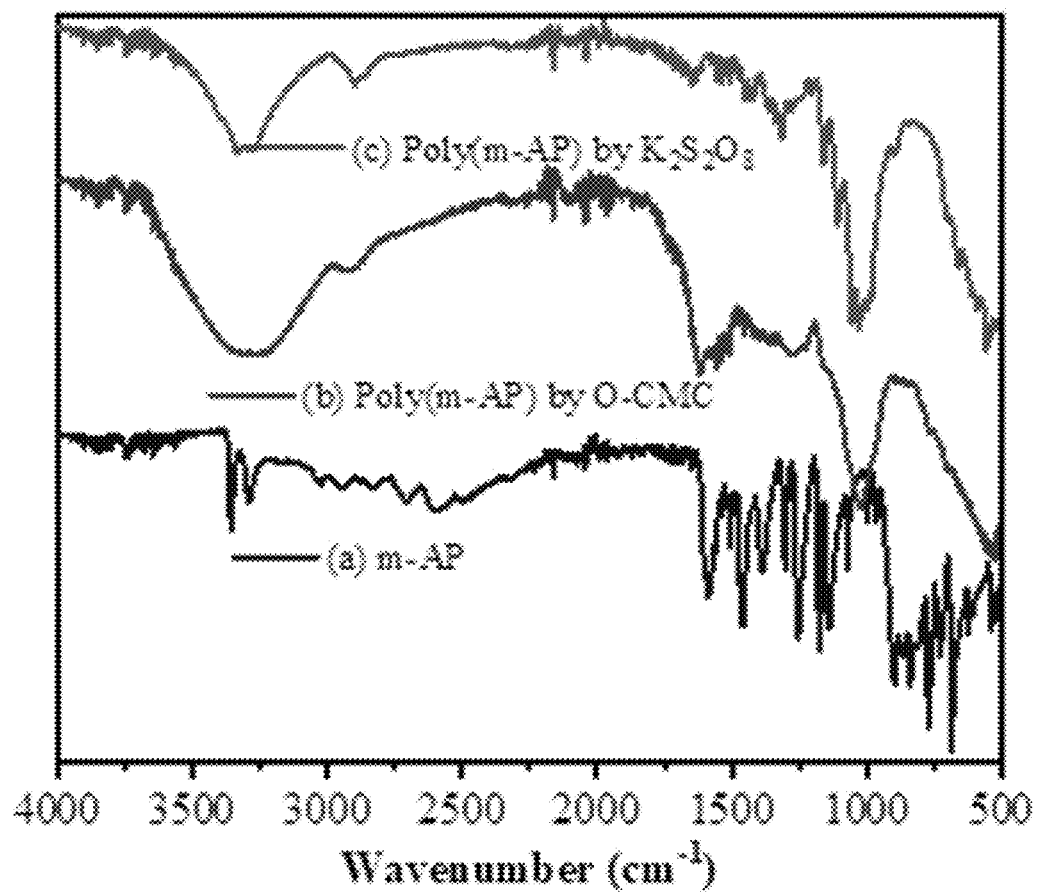
FIG. 11 shows FTIR spectra of pure m-AP, poly(m-AP) synthesized by O-CMC and poly (m-AP) synthesized by $K_2S_2O_8$.
Figure 12A:
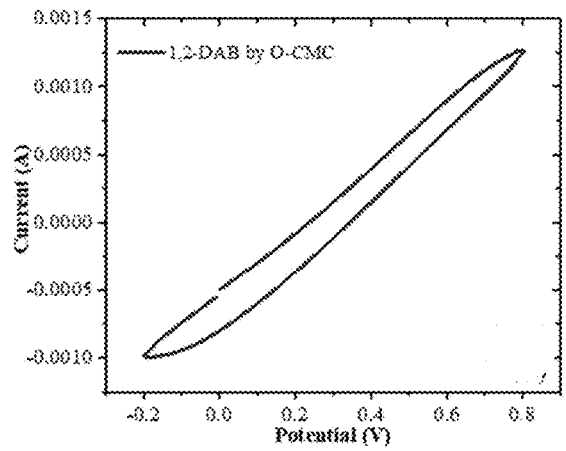
FIGS. 12A-D show cyclic voltammograms response of 1,2-DAB synthesized by (A) 0-CMC, and (B) O-CMC-S, and cyclic voltammograms response of P-OAP synthesized by (C) 0-CMC, (D) O-CMC-S.
Figure 12B:
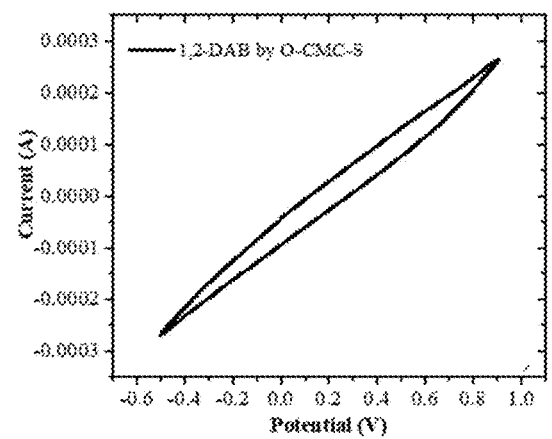
Figure 12C:
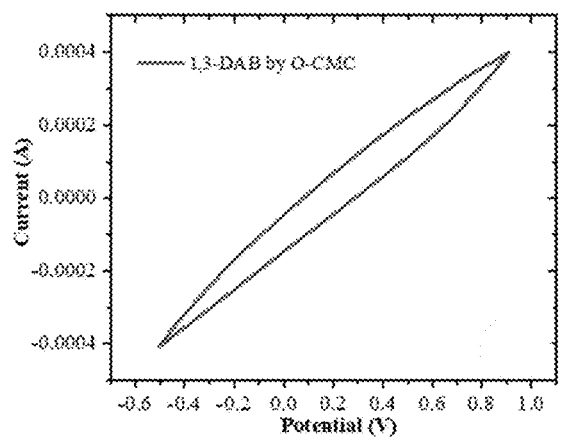
Figure 12D:
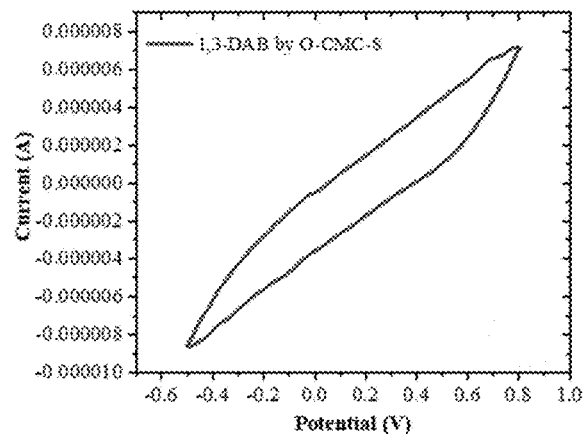

FIG. 11 shows the FT-IR spectra of pure m-AP, poly (m-AP) polymerized by O-CMC and poly (m-AP) polymerized by $K_2S_2O_8$. It can be clearly observed that spectra of both m-AP and poly (m-AP) are entirely different which suggests the feasible polymerization of m-aminophenol. From FIG. 11, existence of IR absorption peaks around 1158 and 1020 $cm^{-1}$ ascribed due to the stretching vibration of C—O—C are shown, which confirms the existence of ether linkages. Moreover, IR peaks around 3355 $cm^{-1}$ may be ascribed the N—H stretching of the secondary amine and IR peak around 1348 $cm^{-1}$ assigned due to C—N stretching of aromatic amine. Another peak around 1459 $cm^{-1}$ can be ascribed to the $NH_2$ bending (scissoring) of primary amine. Here also both types of poly (m-AP) polymerized by O-CMC or $K_2S_2O_8$ exhibit almost similar FTIR spectra, which confirm the potential of O-CMC as an oxidant to polymerize m-AP into poly (m-AP).

Synthesis of 1,2-diaminobenzene (1,2-DAB) and 1,3-diaminobenzene

The amount of 2.0 g of 1,2-diaminobenzene (1,2-DAB) and 1,3-diaminobenzene (1,3-DAB) was separately dissolved in 100 mL of 1 M HCl with constant stirring (400 rpm). The amount of 2 g of each O-CMC-S and O-CMC solubilized in 10 mL 1M HCl was added slowly under continuous stirring into two sets of 1,2-DAB and 1,3-DAB solutions at room temperature. No color changes were observed in all the reaction mixtures even after 30 min of stirring. Therefore, the reaction mixtures were further stirred for 20 h at 25±3° C. Finally, a pale-yellow color was observed at the bottom of flask surfaces of 1,2-DAB and 1,3-DAB solutions that could be due to the formation of poly-(1,2-DAB) and poly-(1,2-DAB). The resultant products were washed thoroughly with the excess of double-distilled water (DDW) to remove the acids until the filtrate became clear and neutral. The resulting yellow color of the products indicates the formation of poly-(1,2-DAB) and poly-(1,2-DAB), using O-CMC-S and O-CMC biopolymers. However, the absence of the redox peaks (cathodic and anodic peaks) currents in the typical cyclic voltammograms (CV) curves around 150 and 200 mV as shown in FIGS. 12A-D, suggest, however, that the products were not an analogue of a conducting poly-(1,2-DAB) and poly-(1,2-DAB) but rather a composite based on CMC and 1,2-DAB and 1,3-DAB.

Acknowledgement

The inventors are grateful to the Department of Chemistry, King Abdulaziz University, Saudi Arabia for providing research facilities and granting the permission to publish this work. This work was supported by the Ministry of Education, King Abdulaziz University Administration of Support for Research and Development Initiatives, Kingdom of Saudi Arabia, under the research scheme Post-Doctoral Researcher awarded to Dr. Ajahar Khan.

It is to be understood that this invention is not limited to any particular embodiment described herein and may vary. It is also to be understood that the terminology used herein is for the purpose of describing particular embodiments only, and is not intended to be limiting, since the scope of the present invention will be limited only by the appended claims.

Where a range of values is provided, it is understood that each intervening value between the upper and lower limit of that range (to a tenth of the unit of the lower limit) is included in the range and encompassed within the invention, unless the context or description clearly dictates otherwise. In addition, smaller ranges between any two values in the range are encompassed, unless the context or description clearly indicates otherwise.

Unless defined otherwise, all technical and scientific terms used herein have the same meaning as commonly understood by one of ordinary skill in the art to which this invention belongs. Representative illustrative methods and materials are herein described; methods and materials similar or equivalent to those described herein can also be used in the practice or testing of the present invention.

All publications and patents cited in this specification are herein incorporated by reference as if each individual publication or patent were specifically and individually indicated to be incorporated by reference, and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual dates of public availability and may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as support for the recitation in the claims of such exclusive terminology as "solely," "only" and the like in connection with the recitation of claim elements, or use of a "negative" limitations, such as "wherein [a particular feature or element] is absent", or "except for [a particular feature or element]", or "wherein [a particular feature or element] is not present (included, etc.) . . . ".

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

REFERENCES

[1] Yuan G-L, Kuramoto N. Synthesis of Helical Polyanilines Using Chondroitin Sulfate as a Molecular Template. Macromol Chem Phys 2004; 205:1744-51. doi.org/10.1002/macp 0.200400184.

[2] Massoumi B, Abbasian M, Jahanban-Esfahlan R, Mohammad-Rezaei R, Khalilzadeh B, Samadian H, et al. A novel bio-inspired conductive, biocompatible, and adhesive terpolymer based on polyaniline, polydopamine, and polylactide as scaffolding biomaterial for tissue engineering application. Int J Biol Macromol 2020; 147:1174-84. doi.org/10.1016/j.ijbiomac.2019.10.086.

[3] Mohseni M, S. A. A R, H-Shirazi F, Nemati N H. Preparation and characterization of self-electrical stimuli conductive gellan based nano scaffold for nerve regeneration containing chopped short spun nanofibers of PVDF/MCM41 and polyaniline/graphene nanoparticles: Physical, mechanical and morphological. Int J Biol Macromol 2020. doi.org/10.1016/j.ijbiomac.2020.11.045.

[4] Kumari Jangid N, Jadoun S, Kaur N. A review on high-throughput synthesis, deposition of thin films and properties of polyaniline. Eur Polym J 2020; 125:109485. doi.org/10.1016/j.eurpolymj.2020.109485.

[5] Ahmed S M. Mechanistic investigation of the oxidative polymerization of aniline hydrochloride in different media. Polym Degrad Stab 2004; 85:605-14. doi.org/10.1016/j.polymdegradstab.2004.01.003.

[6] Stejskal J, Sapurina I, Trchová M. Polyaniline nanostructures and the role of aniline oligomers in their formation. Prog Polym Sci 2010; 35:1420-81. doi.org/10.1016/j.progpolymsci.2010.07.006.

[7] Pawar S G, Patil S L, Chougule M A, Mane A T, Jundale D M, Patil V B. Synthesis and Characterization of Polyaniline:TiO 2 Nanocomposites. Int J Polym Mater 2010; 59:777-85. doi.org/10.1080/00914037.2010.483217.

[8] Kulkarni M V., Viswanath A K, Marimuthu R, Seth T. Synthesis and characterization of polyaniline doped with organic acids. J Polym Sci Part A Polym Chem 2004; 42:2043-9. doi.org/10.1002/pola.11030.

[9] V. G. Sergeev, N. A. Lokshin, V. B. Golubev, A. B. Zezin K L & V A K. Synthesis of a Conducting Interpolymer Polyaniline—DNA Complex. Dokl Phys Chem 2003; 390:118-21. doi.org/10.1023/A:1023970427415.

[10] Rezk A I, Bhattarai D P, Park J, Park C H, Kim C S. Polyaniline-coated titanium oxide nanoparticles and simvastatin-loaded poly(ε-caprolactone) composite nanofibers scaffold for bone tissue regeneration application. Colloids Surfaces B Biointerfaces 2020; 192:111007. doi.org/10.1016/j.colsurfb.2020.111007.

[11] Milakin K A, Gavrilov N, Pasťi I A, Morávková Z, Acharya U, Unterweger C, et al. Polyaniline-metal organic framework (Fe-BTC) composite for electrochemical applications. Polymer (Guildf) 2020; 208: 122945. doi.org/10.1016/j.polymer.2020.122945.

[12] Ben Ali M, Wang F, Boukherroub R, Lei W, Xia M. Phytic acid-doped polyaniline nanofibers-clay mineral for efficient adsorption of copper (II) ions. J Colloid Interface Sci 2019; 553:688-98. doi.org/10.1016/j.jcis.2019.06.065.

[13] de Barros A, Constantino C J L, da Cruz N C, Bortoleto J R R, Ferreira M. High performance of electrochemical sensors based on LbL films of gold nanoparticles, polyaniline and sodium montmorillonite clay mineral for simultaneous detection of metal ions. Electrochim Acta 2017; 235:700-8. doi.org/10.1016/j.electacta.2017.03.135.

[14] Goto H, Yokoo A. Polyaniline Nanospheres Synthesized in the Presence of Polyvinyl Alcohol Followed by Preparation of Carbon Nanobeads Structures. J Dispers Sci Technol 2013; 34:406-10. doi.org/10.1080/01932691.2012.662435.

[15] Konyushenko E N, Stejskal J, Šeděnková I, Trchová M, Sapurina I, Cieslar M, et al. Polyaniline nanotubes: conditions of formation. Polym Int 2006; 55:31-9. doi.org/10.1002/pi.1899.

[16] Abalyaeva V V, Efimov M N, Efimov O N, Karpacheva G P, Dremova N N, Kabachkov E N, et al. Electrochemical synthesis of composite based on polyaniline and activated I R pyrolyzed polyacrylonitrile on graphite foil electrode for enhanced supercapacitor properties. Electrochim Acta 2020; 354:136671. doi.org/10.1016/j.electacta.2020.136671.

[17] Stejskal J, Gilbert R G. Polyaniline. Preparation of a conducting polymer (IUPAC Technical Report). Pure Appl Chem 2002; 74. https://doi.org/10.1351/pac200274050857.

[18] Sapurina I, Stejskal J. The mechanism of the oxidative polymerization of aniline and the formation of supramolecular polyaniline structures. Polym Int 2008; 57:1295-325. doi.org/10.1002/pi.2476.

[19] Stejskal J, Trchová M. Aniline oligomers versus polyaniline. Polym Int 2012; 61:240-51. doi.org/10.1002/pi.3179.

[20] Bláha M, Trchová M, Bober P, Morávková Z, Prokeš J, Stejskal J. Polyaniline: Aniline oxidation with strong and weak oxidants under various acidity. Mater Chem Phys 2017; 194:206-18. doi.org/10.1016/j.matchemphys.2017.03.028.

[21] Tucceri R. Poly(o-aminophenol) Film Electrodes. Cham: Springer Cham; 2013. doi.org/10.1007/978-3-319-02114-0.

[22] Ortega J M. Conducting potential range for poly(o-aminophenol). Thin Solid Films 2000; 371:28-35. doi.org/10.1016/S0040-6090(00)00980-9.

[23] Fan L, Zhou X, Wu P, Xie W, Zheng H, Tan W, et al. Preparation of carboxymethyl cellulose sulfates and its application as anticoagulant and wound dressing. Int J Biol Macromol 2014; 66:245-53. doi.org/10.1016/j.ijbiomac.2014.02.040.

[24] Han S, Lee M, Kim B K. Crosslinking reactions of oxidized cellulose fiber. I. Reactions between dialdehyde cellulose and multifunctional amines on lyocell fabric. J Appl Polym Sci 2010; 117:682-90. doi.org/10.1002/app.30895.

[25] Yao M, Wang Z, Liu Y, Yang G, Chen J. Preparation of dialdehyde cellulose greatead graphene oxide composite and its adsorption behavior for heavy metals from aqueous solution. Carbohydr Polym 2019; 212:345-51. doi.org/10.1016/j.carbpol.2019.02.052.

[26] Zhang L, Yan P, Li Y, He X, Dai Y, Tan Z. Preparation and antibacterial activity of a cellulose-based Schiff base derived from dialdehyde cellulose and L-lysine. Ind Crops Prod 2020; 145:112126. doi.org/10.1016/j.indcrop.2020.112126.

[27] Wang P, He H, Cai R, Tao G, Yang M, Zuo H, et al. Cross-linking of dialdehyde carboxymethyl cellulose with silk sericin to reinforce sericin film for potential biomedical application. Carbohydr Polym 2019; 212:403-11. doi.org/10.1016/j.carbpol.2019.02.069.

[28] Molina J, Esteves M F, Fernández J, Bonastre J, Cases F. Polyaniline coated conducting fabrics. Chemical and electrochemical characterization. Eur Polym J 2011. doi.org/10.1016/j.eurpolymj.2011.07.021.

[29] Park Y, Numan A, Ponomarev N, Iqbal J, Khalid M. Enhanced photocatalytic performance of PANI-rGO-MnO2 ternary composite for degradation of organic contaminants under visible light. J Environ Chem Eng 2021: 106006. doi.org/10.1016/j.jece.2021.106006.

[30] Ahirrao D J, Pal A K, Singh V, Jha N. Nanostructured porous polyaniline (PANI) coated carbon cloth (C C) as electrodes for flexible supercapacitor device. J Mater Sci Technol 2021; 88:168-82. doi.org/10.1016/j.jmst.2021.01.075.

[31] Shaabani A, Sedghi R. Preparation of chitosan biguanidine/PANI-containing self-healing semi-conductive waterborne scaffolds for bone tissue engineering. Carbohydr Polym 2021; 264:118045. doi.org/10.1016/j.carbpol.2021.118045.

[32] Stejskal J, Sapurina I, Trchová M, Konyushenko E N. Oxidation of Aniline: Polyaniline Granules, Nanotubes, and Oligoaniline Microspheres. Macromolecules 2008; 41:3530-6. doi.org/10.1021/ma702601q.

[33] Křiž J, Starovoytova L, Trchová M, Konyushenko E N, Stejskal J. NMR Investigation of Aniline Oligomers Produced in the Early Stages of Oxidative Polymerization of Aniline. J Phys Chem B 2009; 113:6666-73. doi.org/10.1021/jp9007834.

[34] Hebeish A, Higazy A, El-Shafei A, Sharaf S. Synthesis of carboxymethyl cellulose (CMC) and starch-based hybrids and their applications in flocculation and sizing. Carbohydr Polym 2010; 79:60-9. doi.org/10.1016/j.carbpol.2009.07.022.

[35] Gautam V, Srivastava A, Singh K P, Yadav V L. Vibrational and gravimetric analysis of polyaniline/polysaccharide composite materials. Polym Sci Ser A 2016; 58:206-19. doi.org/10.1134/50965545X16020085.

[36] Yang J, Du Y, Huang R, Wan Y, Li T. Chemical modification, characterization and structure-anticoagulant activity relationships of Chinese lacquer polysaccharides. Int J Biol Macromol 2002; 31:55-62. doi.org/10.1016/S0141-8130(02)00066-1.

[37] Aydemir Sezer U, Sahin I, Aru B, Olmez H, Yamkkaya Demirel G, Sezer S. Cytotoxicity, bactericidal and hemostatic evaluation of oxidized cellulose microparticles: Structure and oxidation degree approach. Carbohydr Polym 2019; 219:87-94. doi.org/10.1016/j.carbpol.2019.05.005.

[38] Vicini S, Princi E, Luciano G, Franceschi E, Pedemonte E, Oldak D, et al. Thermal analysis and characterisation of cellulose oxidised with sodium methaperiodate. Thermochim Acta 2004; 418:123-30. doi.org/10.1016/j.tca.2003.11.049.

[39] Khalid M, Tumelero M A, Zoldan V C, Pla Cid C C, Franceschini D F, Timm R A, et al. Polyaniline nanofibers—graphene oxide nanoplatelets composite thin film electrodes for electrochemical capacitors. RSC Adv 2014; 4:34168-78. doi.org/10.1039/C4RA06145D.

[40] Ontolan J P B, Alcantara P A M, Vequizo R M, Odarve M K, Sambo B R B. Properties of in situ HCl-doped emeraldine polyaniline on n-Si(100) substrates for diode application. Phys Status Solidi 2015; 12:580-3. doi.org/10.1002/pssc.201400328.

[41] Behzadi M, Mirzaei M, Daneshpajooh M. Carbon nanotubes/poly-ortho-aminophenol composite as a new coating for the headspace solid-phase microextraction of polycyclic aromatic hydrocarbons. Anal Methods 2014; 6:9234-41. doi.org/10.1039/C4AY01926A.

[42] Stejskal J, Sapurina I. Polyaniline: Thin films and colloidal dispersions (IUPAC Technical Report). Pure Appl Chem 2005; 77:815-26. doi.org/10.1351/pac200577050815.

[43] Sapurina I, Stejskal J. Ternary composites of multi-wall carbon nanotubes, polyaniline, and noble-metal nanoparticles for potential applications in electrocatalysis. Chem Pap 2009; 63. doi.org/10.2478/s11696-009-0061-3.

[44] Jia B, Hino T, Kuramoto N. Synthesis and chiroptical properties of water-processable polyaniline using methylcellulose as a molecular template. React Funct Polym 2007; 67:836-43. doi.org/10.1016/j.reactfunctpolym.2007.01.005.

[45] Wang C, Shen Y, Wang X, Zhang H, Xie A. Synthesis of novel NiZn-ferrite/Polyaniline nanocomposites and their microwave absorption properties. Mater Sci Semicond Process 2013; 16:77-82. doi.org/10.1016/j.mssp.2012.06.015.

[46] Shao W, Jamal R, Xu F, Ubul A, Abdiryim T. The Effect of a Small Amount of Water on the Structure and Electrochemical Properties of Solid-State Synthesized Polyaniline. Materials (Basel) 2012; 5:1811-25. doi.org/10.3390/ma5101811.

[47] Abdiryim T, Jamal R, Nurulla I. Doping effect of organic sulphonic acids on the solid-state synthesized polyaniline. J Appl Polym Sci 2007; 105:576-84. doi.org/10.1002/app. 26070.

[48] Zhang L, Wan M, Wei Y. Nanoscaled Polyaniline Fibers Prepared by Ferric Chloride as an Oxidant. Macromol Rapid Commun 2006; 27:366-71. doi.org/10.1002/marc.200500760.

[49] Saravanan C, Palaniappan S, Chandezon F. Synthesis of nanoporous conducting polyaniline using ternary surfactant. Mater Lett 2008; 62:882-5. doi.org/10.1016/j.matlet.2007.07.003.

[50] Asiri A M, Adeosun W A, Marwani H M, Rahman M M. Homopolymerization of 3-aminobenzoic acid for enzyme-free electrocatalytic assay of nitrite ions. New J Chem 2020; 44:2022-32. doi.org/10.1039/C9NJ06058H.

[51] Ahmed J, Rakib R H, Rahman M M, Asiri A M, Siddiquey I A, Islam S S M, et al. Electrocatalytic Oxidation of 4-Aminophenol Molecules at the Surface of an FeS 2/Carbon Nanotube Modified Glassy Carbon Electrode in Aqueous Medium. Chempluschem 2019; 84:175-82. doi.org/10.1002/cplu.201800660.

[52] Kuralay F, Dumangöz M, Tung S. Polymer/carbon nanotubes coated graphite surfaces for highly sensitive nitrite detection. Talanta 2015; 144:1133-8. doi.org/10.1016/j.talanta.2015.07.095.

[53] Hu C-C, Lin J-Y. Effects of the loading and polymerization temperature on the capacitive performance of polyaniline in NaNO3. Electrochim Acta 2002; 47:4055-67. doi.org/10.1016/S0013-4686(02)00411-5.

[54] Li Y, Zhao X, Xu Q, Zhang Q, Chen D. Facile Preparation and Enhanced Capacitance of the Polyaniline/Sodium Alginate Nanofiber Network for Supercapacitors. Langmuir 2011; 27:6458-63. doi.org/10.1021/1a2003063.

[55] Tucceri R. Redox Transformation of Poly(o-aminophenol) (POAP) Film Electrodes under Continuous Potential Cycling. Procedia Mater Sci 2015; 8:261-70. doi.org/10.1016/j.mspro.2015.04.072.

[56] A Ghanem M. Development of Conducting Poly(o-Aminophenol) Film and its Capacitance Behavior. Int J Electrochem Sci 2016:9987-97. doi.org/10.20964/2016.12.68.

Acknowledgment

The authors extend their appreciation to the Deputyship for Research & Innovation, Ministry of Education in Saudi Arabia for funding this research work through the project number (2021-005) and King Abdulaziz University, DSR, Jeddah, Saudi Arabia.

What is claimed is:

1. A method of making a polymer, comprising:
    mixing carboxymethyl cellulose (CMC) with $NaIO_4$ to produce oxidized CMC (O-CMC);
    quenching with ethylene glycol; and
    reacting the oxidized CMC with aniline or an aniline derivative in an acidic aqueous solution to form polyaniline or a polymerized aniline derivative,
    wherein the method does not use ammonium persulfate.

2. The method of claim 1, wherein the oxidized CMC and the aniline or the aniline derivative are in a 1:2 to 2:1% by weight ratio.

3. The method of claim 1, wherein the method does not use potassium persulfate as an oxidant.

4. The method of claim 1, wherein the aniline derivative is selected from the group consisting of 1,2-diaminobenzene, 2,3-diaminonaphthalene, o-aminophenol, m-aminophenol, iso-aminophenol, m-toluidine and 1,3-diaminobenzene.

5. The method of claim 1, wherein the aniline derivative is iso-aminophenol.

6. The method of claim 1, wherein the % by weight ratio of the $NaIO_4$ and the CMC is 1:1.

7. The method of claim 1, further comprising steps of washing and drying the polyaniline or the polymerized aniline derivative.

8. The method of claim 1, wherein the acidic aqueous solution is made by adding an acid selected from the group consisting of hydrochloric acid, hydrogen bromide, sulfuric acid, perchloric acid, nitric acid, phosphoric acid, phosphonic acid, trifluoromethanesulphonic acid, toluene sulphonic acid, dodecylbenzenesulphonic acid, carboxylic acids, acetic acid, trichloroacetic acid, trifluoroacetic acid, formic acid, (1R)-(−)-10-camphorsulfonic acid, (1S)-(+)-10 camphorsulfonic acid, 2-acrylamido-2-methyl-1-propane sulfonic acid, and methanesulfonic acid.

9. A method of making a polymer, comprising:
    mixing CMC with $N(SO_3Na)_3$ at 40-60° C. for 4-8 hours to form CMC-S;
    oxidizing the CMC-S by mixing with $NaIO_4$ to form oxidized CMC-S(O-CMC-S);
    quenching by adding ethylene glycol; and
    reacting the O-CMC-S with aniline or an aniline derivative in an acidic aqueous solution to form polyaniline or a polymerized aniline derivative.

10. The method of claim 9, wherein the reaction does not use ammonium persulfate or potassium persulfate as an oxidant.

11. The method of claim 10, wherein the aniline derivative is selected from the group consisting of 1,2-diaminobenzene, 2,3-diaminonaphthalene, o-aminophenol, m-aminophenol, iso-aminophenol, m-toluidine and 1,3-diaminobenzene.

12. The method of claim 10, wherein the aniline derivative is iso-aminophenol.

13. The method of claim 10, wherein the $NaIO_4$ and the CMC-S are in a 1:1% by weight ratio.

14. The method of claim 10, further comprising steps of washing and drying the polyaniline or the polymerized aniline derivative.

15. The method of claim 10, wherein the O-CMC-S is in a 1:2 to 2:1% by weight ratio with the aniline or the aniline derivative.

16. The method of claim 10, wherein the acidic aqueous solution is made by adding an acid selected from the group consisting of hydrochloric acid, hydrogen bromide, sulfuric acid, perchloric acid, nitric acid, phosphoric acid, phosphonic acid, trifluoromethanesulphonic acid, toluene sulphonic acid, dodecylbenzenesulphonic acid, carboxylic acids, acetic acid, trichloroacetic acid, trifluoroacetic acid, formic acid, (1R)-(−)-10-camphorsulfonic acid, (1S)-(+)-10 camphorsulfonic acid, 2-acrylamido-2-methyl-1-propane sulfonic acid, and methanesulfonic acid.

\* \* \* \* \*